US012317027B2

(12) United States Patent
Ishibashi

(10) Patent No.: US 12,317,027 B2
(45) Date of Patent: May 27, 2025

(54) INFORMATION PROCESSING DEVICE AND INFORMATION PROCESSING METHOD

(71) Applicant: SONY GROUP CORPORATION, Tokyo (JP)

(72) Inventor: Satoru Ishibashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 135 days.

(21) Appl. No.: 17/998,685

(22) PCT Filed: Apr. 5, 2021

(86) PCT No.: PCT/JP2021/014434
§ 371 (c)(1),
(2) Date: Nov. 14, 2022

(87) PCT Pub. No.: WO2021/235117
PCT Pub. Date: Nov. 25, 2021

(65) Prior Publication Data

US 2023/0254629 A1 Aug. 10, 2023

(30) Foreign Application Priority Data

May 21, 2020 (JP) ................................ 2020-089031
Aug. 5, 2020 (JP) ................................ 2020-133413

(51) Int. Cl.
*H04R 1/10* (2006.01)

(52) U.S. Cl.
CPC ......... *H04R 1/1083* (2013.01); *H04R 1/1041* (2013.01); *H04R 1/1058* (2013.01)

(58) Field of Classification Search
None
See application file for complete search history.

(56) References Cited

U.S. PATENT DOCUMENTS

2018/0295455 A1 10/2018 Eichfeld et al.
2020/0074662 A1 3/2020 Williams
2021/0014596 A1 * 1/2021 Sun ........................ H04L 65/60

FOREIGN PATENT DOCUMENTS

JP 2016-015585 A 1/2016

OTHER PUBLICATIONS

International Search Report and Written Opinion of PCT Application No. PCT/JP2021/014434, issued on Jun. 29, 2021, 08 pages of ISRWO.

* cited by examiner

*Primary Examiner* — Kenny H Truong
(74) *Attorney, Agent, or Firm* — CHIP LAW GROUP

(57) ABSTRACT

An information processing device 10 according to an embodiment includes an acquiring unit 111 that acquires information concerning sound propagating in a space separated from an outside world by a support member that separates the space including an eardrum of a user and the outside world, a measuring unit 1121 that measures a sealing degree of the space by the support member based on the information concerning the sound acquired by the acquiring unit 111, and a determining unit 1122 that determines, based on sealing degrees measured by the measuring unit 1121 for a respective different plurality of support members, an optimum support member for the user out of a plurality of support members.

22 Claims, 22 Drawing Sheets

FIG.13

120

| DETERMINATION RESULT ID | DETERMINATION RESULT (OPTIMUM EARPHONE) | ... |
|---|---|---|
| DT11 | L: S (FIRST PLACE), M (SECOND PLACE), L (THIRD PLACE)<br>R: M (FIRST PLACE), S (SECOND PLACE), L (THIRD PLACE) | ... |
| DT12 | L: M (FIRST PLACE), L (SECOND PLACE), S (THIRD PLACE)<br>R: S (FIRST PLACE), L (SECOND PLACE), M (THIRD PLACE) | ... |
| ... | ... | ... |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/014434 filed on Apr. 5, 2021, which claims priority benefit of Japanese Patent Application No. JP 2020-133413 filed in the Japan Patent Office on Aug. 5, 2020 and which claims priority benefit of Japanese Patent Application No. JP 2020-089031 filed in the Japan Patent Office on May 21, 2020. Each of the above-referenced applications is hereby incorporated herein by reference in its entirety.

FIELD

The present invention relates to an information processing device, an information processing method, and an information processing program.

BACKGROUND

In recent years, development of a technology for supporting provision of audio (sound) in contact with an ear of a listener (a user) such as an earphone, an earpieces, or an earpad equipped with a speaker and a microphone has been widespread. For example, there has been known a technique for measuring (calculating) a sealing degree of a user's ear by reproducing (outputting), from speakers, measurement sound for measuring an acoustic characteristic of the user's ear.

CITATION LIST

Patent Literature

Patent Literature 1: JP 2016-015585 A

SUMMARY

Technical Problem

However, in the related art, there is room for promoting further improvement in usability. For example, in the related art, there is room for promoting improvement in performance of noise cancelling (NC).

Therefore, the present disclosure proposes am information processing device, an information processing method, and an information processing program, which are new and improved, capable of promoting further improvement in usability.

Solution to Problem

According to the present disclosure, an information processing device includes: an acquiring unit that acquires information concerning a sound propagating in a space separated from an outside world by a support member that separates the space including an eardrum of a user and the outside world; and a measuring unit that measures a sealing degree of the space by the support member based on the information concerning the sound acquired by the acquiring unit; and a determining unit that determines, based on sealing degrees measured by the measuring unit for a respective plurality of different support members, an optimum support member for the user out of the plurality of support members.

BRIEF DESCRIPTION OF DRAWINGS

FIG. 13 is a diagram illustrating an example of a storing unit according to the embodiment.

DESCRIPTION OF EMBODIMENTS

Figure 1:
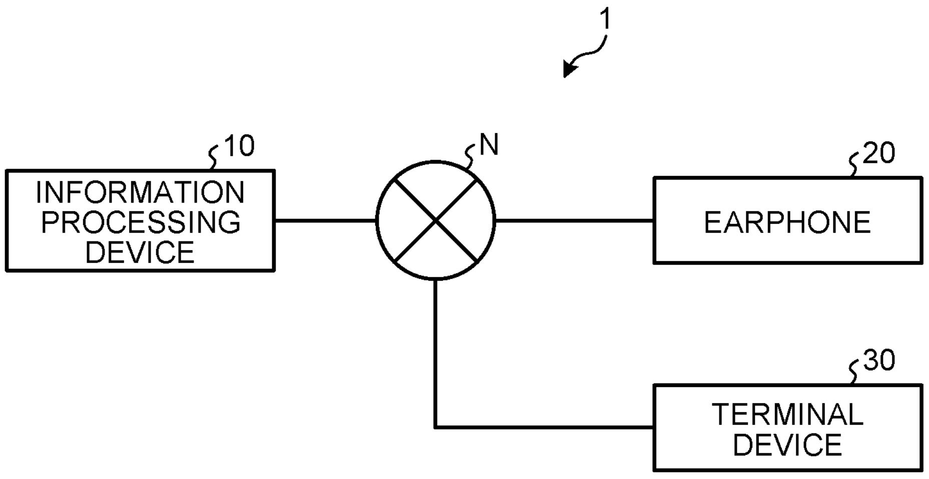
FIG. 1 is a diagram illustrating a configuration example of an information processing system according to an embodiment.

A referred embodiment of the present disclosure is explained in detail below with reference to the accompanying drawings. Note that, in the present specification and the drawings, components having substantially the same functional configurations are denoted by the same reference numerals and signs, whereby redundant explanation of the components is omitted.

Note that the explanation is made in the following order.

1. Embodiment of the present disclosure
1.1. Introduction
1.2. Configuration of an information processing system
2. Functions of the information processing system
2.1. Overview of functions
2.2. Functional configuration example
2.3. Processing of the information processing system
2.4. Variations of processing
3. Hardware Configuration Example
4. Summary

1. EMBODIMENT OF THE PRESENT DISCLOSURE

<1.1. Introduction>

In an earphone or the like equipped with a speaker and a microphone, measurement sound (hereinafter referred to as "measurement signal" as appropriate) output from the speaker is transmitted to an eardrum through an ear canal of a user. Examples of the measurement sound include a music signal, a sine wave, and white noise. An acoustic characteristic (an ear canal frequency characteristic) of the user's ear can be measured by collecting the measurement signal returned via the user's ear canal with the microphone. The measurement signal collected by the microphones is hereinafter referred to as "sound collection signal". The sound collection signal is a measurement signal measured by the earphone or the like. The ear canal frequency characteristic is an amplitude characteristic until the measurement signal is output from the speaker and reaches the microphone. By measuring the ear canal frequency characteristic of the user, a sealing degree of the ear canal by the earphone or the like can be measured.

In relation to the above technology, for example, there has been known an individual optimization technique for comparing an ear canal frequency characteristic of a user with a predetermined target characteristic, automatically selecting a filter that absorbs a difference from the target characteristic due to an individual difference or a wearing state, and automatically adjusting a filter for noise cancelling and an equalizer for sound quality adjustment (Patent Literature 1). However, there is a limit in correction with the filter. For example, when a headphone or an earphone cannot be correctly worn and a sealing degree of an ear canal is low, external noise enters from a gap between the headphone or the like and the ear canal and noise that cannot be sufficiently canceled even by individually-optimized noise cancelling reaches the eardrum via the ear canal. When the sealing degree of the ear canal is low, a filter that excessively amplifies a low frequency is necessary. However, when such a filter is applied to an audio signal, it is likely that a waveform is clipped and sound quality is excessively deteriorated. Therefore, in the related art, there is room for promoting further improvement in usability in order to cause the user to experience best noise cancelling.

In the prior art, for example, it is sometimes unknown which earphone is optimum for the user and how the user should wear the earphone. For this reason, in the related art, there is room for promoting further improvement in usability in order to reduce cases in which noise cancelling is ineffective and cause the user to experience the best noise cancelling.

Therefore, the present disclosure proposes am information processing device, an information processing method, and an information processing program, which are new and improved, capable of promoting further improvement in usability.

<1.2. Configuration of an Information Processing System>

A configuration of an information processing system 1 according to the embodiment is explained. FIG. 1 is a diagram illustrating a configuration example of the information processing system 1. As illustrated in FIG. 1, the information processing system 1 includes an information processing device 10, an earphone 20, and a terminal device 30. Various devices can be connected to the information processing device 10. For example, the earphone 20 and the terminal device 30 are connected to the information processing device 10 and information cooperation is performed among the devices. The information processing device 10, the earphone 20, and the terminal device 30 are connected to an information communication network by wireless or wired communication to be capable of mutually performing information/data communication and operating in cooperation. The information communication network can be configured by the Internet, a home network, an IoT (Internet of Things) network, a P2P (Peer-to-Peer) network, a proximity communication mesh network, or the like. For the wireless communication, for example, Wi-Fi, Bluetooth (registered trademark), or a technology based on a mobile communication standard such as 4G or 5G can be used. For the wired communication, a power line communication technology such as Ethernet (registered trademark) or Power Line Communications (PLC) can be used.

The information processing device 10, the earphone 20, and the terminal device 30 may be separately provided as a plurality of computer hardware devices on so-called on-premise, an edge server, or a Cloud or functions of any plurality of devices among the information processing device 10, the earphone 20, and the terminal device 30 may be provided as the same device. For example, among the information processing device 10, the earphone 20, and the terminal device 30, the information processing device 10 and the earphone 20 may be provided as devices that integrally function and communicate with the terminal device 30. Further, the user is enabled to mutually perform information/data communication with the information processing device 10, the earphone 20, and the terminal device 30 via a user interface (including a graphical user interface (GUI) or software (configured by a computer program (hereinafter referred to as program as well)) operating on a not-illustrated terminal device (a personal device such as a personal computer (PC) including a display functioning as an information display device and voice and keyboard input or a smartphone).

(1) Information Processing Device 10

The information processing device 10 is an information processing device that performs processing for determining the earphone 20 optimum for the user out of a plurality of earphones 20 based on sealing degrees measured for the respective plurality of earphones 20 having different sizes (for example, Small: S, Medium: M, Large: L). Specifically, the information processing device 10 acquires information concerning sound collection signals measured by the plurality of earphones 20. Then, the information processing device 10 measures sealing degrees of the ear canal by the plurality of earphones 20 based on the acquired information concerning the sound collection signal. The information processing device 10 determines the earphone 20 optimum for the user out of the plurality of earphones 20 based on the measured sealing degrees. Consequently, the information processing device 10 can propose the earphone 20 optimum for the user. For example, the information processing device 10 can promote improvement in a noise cancelling technique in which a sealing degree is important.

The information processing device 10 also has a function of controlling the overall operation of the information processing system 1. For example, the information processing device 10 controls the overall operation of the information processing system 1 based on information cooperated between the devices. Specifically, the information processing device 10 measures a sealing degree by the earphone 20 based on information received from the earphone 20.

The information processing device 10 is realized by a PC (Personal computer), a server (Server), or the like. Note that the information processing device 10 is not limited to the PC, the server, or the like. For example, the information processing device 10 may be a computer hardware device such as a PC or a server in which functions of the information processing device 10 are implemented as an application.

(2) Earphone 20

The earphone 20 is an earphone used by the user to listen to sound. Specifically, the earphone 20 is an earphone that is capable of providing sound by being in contact with the ear of the user. The earphone 20 may be any earphone if the earphone can separate a space including the eardrum of the user and the outside world. The earphone 20 includes, for example, a speaker and a microphone. For example, the earphone 20 may include a plurality of speakers and a plurality of microphones.

The earphone 20 outputs a measurement signal from the speaker. The earphone 20 collects the measurement signal returned from the ear canal with the microphone.

The terminal device 30 is an information processing device used by the user. The terminal device 30 may be any device if the device is capable of realizing processing in the embodiment. The terminal device 30 may be a device such as a smartphone, a tablet terminal, a notebook PC, a desktop PC, a cellular phone, or a PDA.

2. FUNCTIONS OF THE INFORMATION PROCESSING SYSTEM

The configuration of the information processing system 1 is explained above. Subsequently, functions of the information processing system 1 are explained.

In the following explanation, in the embodiment, an earpiece is taken as an example of a support member that separates the space including the eardrum of the user and the outside world. Note that the support member is not limited to the earpiece and may be any member if the member is used to separate the space including the eardrum of the user and the outside world. For example, the support member may be an ear pad, an ear mold, a headphone, a headset, or the like. In the following explanation, in the embodiment, the information processing device 10 acquires information concerning a measurement signal propagating in the space separated from the outside world by the earpiece. In the following explanation, in the embodiment, the earpiece is attached to a first member and a second member.

Sound according to the embodiment may be any sound. For example, the sound according to the embodiment may be sound, voice, music, or the like.

A wearing state in which a sealing degree is maximized according to the embodiment may be a wearing state in which the absolute value of the sealing degree is maximized. In the following explanation, in the embodiment, the wearing state in which the sealing degree is minimized is sometimes referred to as a wearing state in which the sealing degree is maximized.

<2.1. Overview of the Functions>

Figure 2:
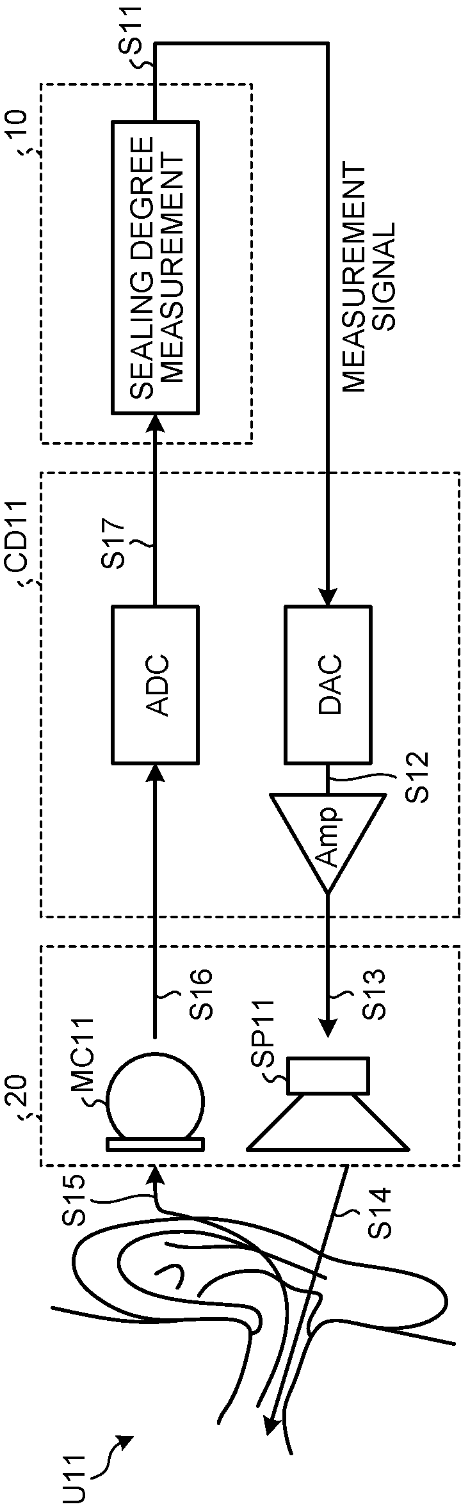
FIG. 2 is a diagram illustrating an overview of functions of the information processing system according to the embodiment.

FIG. 2 is a diagram illustrating an overview of the functions of the information processing system 1 according to the embodiment. Specifically, the information processing system 1 executes processing for measuring a sealing degree. The information processing system 1 generates a measurement signal for measuring a sealing degree (S11). Note that the measurement signal desirably includes, for example, a low frequency of 30 Hz to 100 Hz and a high frequency of 500 Hz to 5 kHz but may be a combination of any bands other than the low frequency and the high frequency. Subsequently, the information processing system 1 converts a generated measurement signal into an analog signal via a digital to analog converter (DAC) of an audio codec CD11 (S12). Subsequently, the information processing system 1 amplifies the measurement signal converted into the analog signal with an amplifier (for example, a headphone amplifier) (S13). The information processing system 1 outputs the amplified measurement signal from a speaker SP11 (S14). At this time, the information processing system 1 outputs the measurement signal toward the ear canal of a user U11 wearing the earphone 20.

The output measurement signal is multiplied by an ear canal frequency characteristic by repeating reflection in the ear canal. The information processing system 1 collects the measurement signal returned from the ear canal of the user U11 with a microphone MC11 (S15). At this time, the information processing system 1 sets, as a sound collection signal, the measurement signal collected by the microphone MC11. Subsequently, the information processing system 1 converts the sound collection signal into a digital signal via an analog to digital converter (ADC) of the audio codec CD11 (S16). The information processing system 1 performs processing for measuring a sealing degree based on the sound collection signal converted into the digital signal (S17).

<2.2. Functional Configuration Example>

Figure 3:
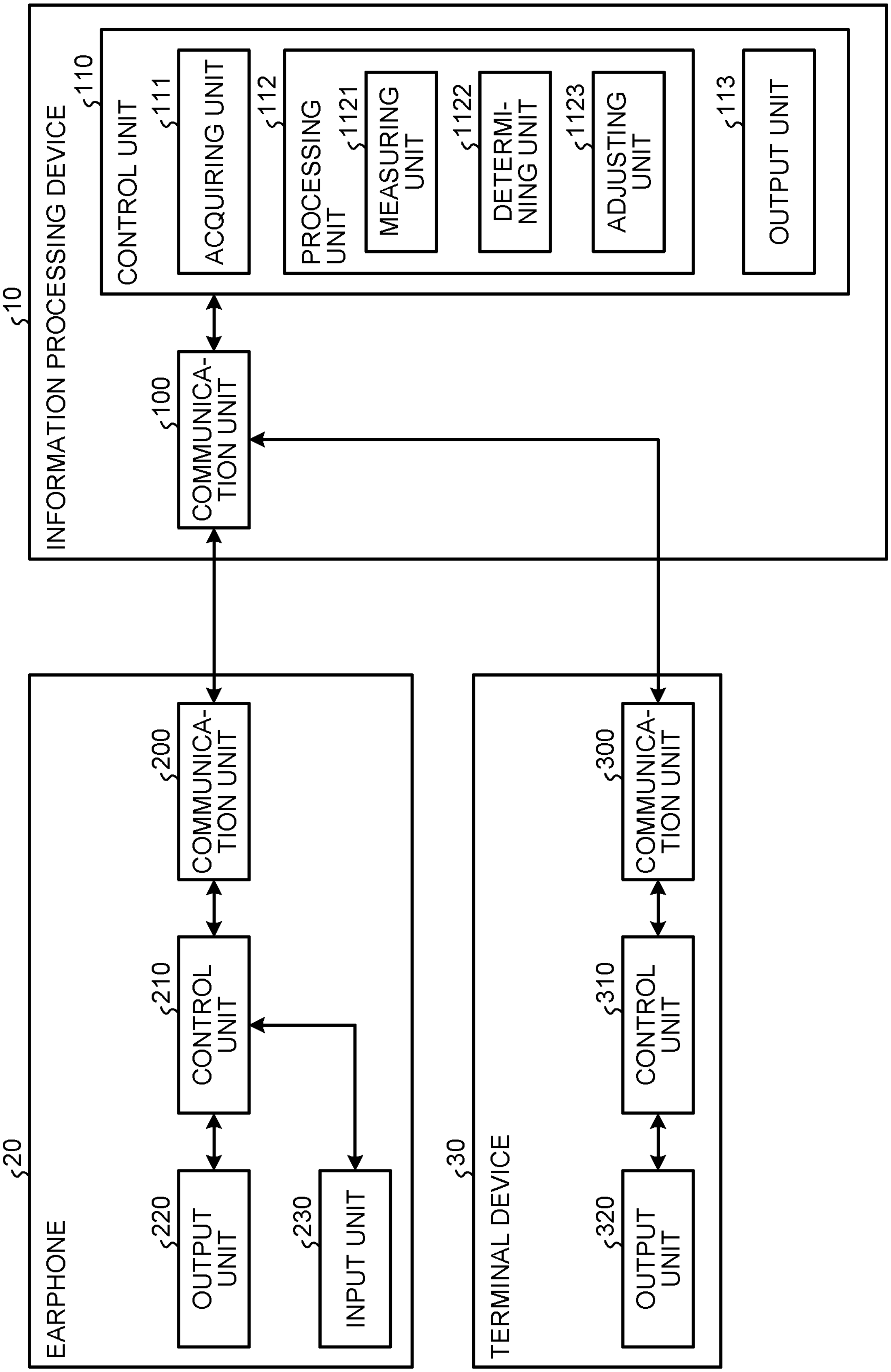
FIG. 3 is a block diagram illustrating a configuration example of the information processing system according to the embodiment.

FIG. 3 is a block diagram illustrating a functional configuration example of the information processing system 1 according to the embodiment.

(1) Information Processing Device 10

As illustrated in FIG. 3, the information processing device 10 includes a communication unit 100 and a control unit 110. Note that the information processing device 10 includes at least the control unit 110.

(1-1) Communication Unit 100

The communication unit 100 has a function of performing communication with an external device. For example, in the communication with the external device, the communication unit 100 outputs information received from the external device to the control unit 110. Specifically, the communication unit 100 outputs information received from the earphone 20 to the control unit 110. For example, the communication unit 100 outputs information concerning a sound collection signal measured by the earphone 20 to the control unit 110.

In the communication with the external device, the communication unit 100 transmits information input from the control unit 110 to the external device. Specifically, the communication unit 100 transmits, to the earphone 20, information concerning acquisition of the information concerning the sound collection signal input from the control unit 110. The communication unit 100 can be configured by a hardware circuit (such as a communication processor), and configured to perform processing according to a computer program operating on a hardware circuit or another processing device (such as a CPU) that controls the hardware circuit.

(1-2) Control Unit 110

The control unit 110 has a function of controlling the operation of the information processing device 10. For example, the control unit 110 performs processing for measuring sealing degrees of the ear canal by earpieces of the respective plurality of earphones 20 having different sizes and determining the earphone 20 having the highest sealing degree. Note that, in the following explanation, wearing the earpiece of the earphone 20 on the user's ear is referred to as wearing the earphone 20 as well.

In order to realize the functions explained above, the control unit 110 includes an acquiring unit 111, a processing unit 112, and an output unit 113 as illustrated in FIG. 3. The control unit 110 may be constituted by a processor such as a CPU and configured to read software (a computer program) for realizing functions of the acquiring unit 111, the processing unit 112, and the output unit 113 from a storing unit 120 and perform processing. One or more of the acquiring unit 111, the processing unit 112, and the output unit 113 can be configured by a hardware circuit (a processor or the like) different from the control unit 110 and configured to be controlled by a computer program operating on the other hardware circuit or the control unit 110.

Acquiring Unit 111

The acquiring unit 111 has a function of acquiring information concerning a sound collection signal measured by the earphone 20. For example, the acquiring unit 111 acquires information concerning a measurement signal collected by the second member (for example, a microphone) provided in the earphone 20. Note that the second member is not limited to the microphone and may be any member if the member is capable of collecting the measurement signal. For example, the acquiring unit 111 acquires information concerning a measurement signal output from the first member (for example, a speaker) provided in the earphone 20. Note that the first member is not limited to the speaker and may be any member if the member is capable of outputting a measurement signal. When there are a plurality of one or both of the first members and the second members included in the earphone 20, information concerning a plurality of measurement signals corresponding thereto is acquired. Here, the measurement signal output from the first member is a sum signal of a different plurality of frequencies. For example, the measurement signal output from the first member is a sum signal including a first frequency included in a frequency band of an audible range (approximately 5 Hz to 20, 000 Hz) and a second frequency included in a frequency band of an audible range in which a frequency is different from the first frequency. Note that either the first frequency or the second frequency may be larger. Bands of the first frequency and the second frequency are not only the ranges described above and may be combinations of any bands. The acquiring unit 111 acquires information concerning a measurement signal, which is a sum signal of a different plurality of frequencies, and a sound collection signal.

The acquiring unit 111 acquires information concerning sound collection signals measured by the plurality of earphones 20 in association with each of the plurality of earphones 20. At this time, the acquiring unit 111 acquires information concerning a plurality of earphones 20 having different predetermined sizes.

Processing Unit 112

The processing unit 112 has a function for controlling processing of the information processing device 10. As illustrated in FIG. 3, the processing unit 112 includes a measuring unit 1121, a determining unit 1122, and an adjusting unit 1123. Each of the measuring unit 1121, the determining unit 1122, and the adjusting unit 1123 included in the processing unit 112 may be configured as an independent computer program module or a plurality of functions may be configured as one collective computer program module.

Measuring Unit 1121

The measuring unit 1121 has a function of measuring a sealing degree.

The measuring unit 1121 measures an ear canal frequency characteristic in order to measure a sealing degree. The measuring unit 1121 measures the ear canal frequency characteristic based on the information concerning the sound collection signal and the information concerning the measurement signal acquired by the acquiring unit 111.

Figure 4:
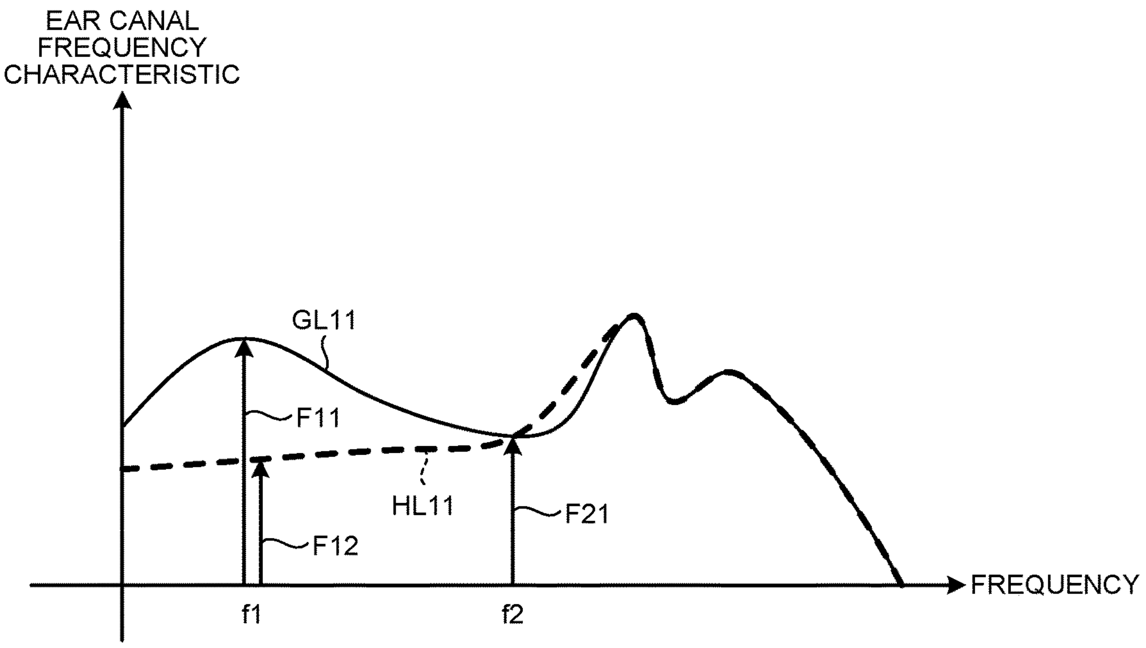
FIG. 4 is a diagram illustrating a relation between an ear canal frequency characteristic and a frequency according to the embodiment.

FIG. 4 illustrates an example of measurement of an ear canal frequency characteristic. Specifically, FIG. 4 illustrates a relation between a frequency of a measurement signal and an ear canal frequency characteristic. A solid line GL11 indicates an ear canal frequency characteristic in the case in which the ear canal of the user is sealed by the earphone 20 (a sealed state). A broken line HL11 indicates an ear canal frequency characteristic in the case in which the user's ear canal is not sealed in comparison with the case of the solid line GL11. For example, the broken line HL11 indicates an ear canal frequency characteristic in the case in which sound leaks from the user's ear canal (a leaking state). A frequency f1 is a low frequency. For example, the frequency f1 is any frequency from 30 Hz to 100 Hz. A frequency f2 is a high frequency. For example, the frequency f2 is any frequency from 500 Hz to 5 kHz. Here, it is assumed that the amplitude of a sound collection signal is used as an indicator indicating the ear canal frequency characteristic. Amplitude F11, amplitude F12, and amplitude F21 are amplitudes corresponding to predetermined frequencies. For example, the amplitude F11 is amplitude of the solid line GL11 corresponding to the frequency f1. For example, the amplitude F12 is amplitude of the broken line HL11 corresponding to the frequency f2. For example, the amplitude F21 is amplitude of the solid line GL11 and the broken line HL11 corresponding to the frequency f2.

In FIG. 4, the amplitude of the frequency f2 is substantially the same in the sealed state and the leaking state. The amplitude of the frequency f1 is greatly different between the sealed state and the leaking state compared with the case of the frequency f2. The measuring unit 1121 uses, as a reference, one frequency at which the sealed state and the leaking state are substantially the same. The measuring unit 1121 compares amplitude with a reference amplitude and measures a sealing degree based on information concerning a difference in the amplitude between the sealed state and the leaking state at a low frequency. The following Formula (1) shows an example of a calculation formula for measurement of a sealing degree by the measuring unit 1121.

$$\text{Sealing degree} = 20 \times \log_{10} \frac{\text{Amplitude } f_1}{\text{Amplitude } f_2} \quad (1)$$

Figure 5:
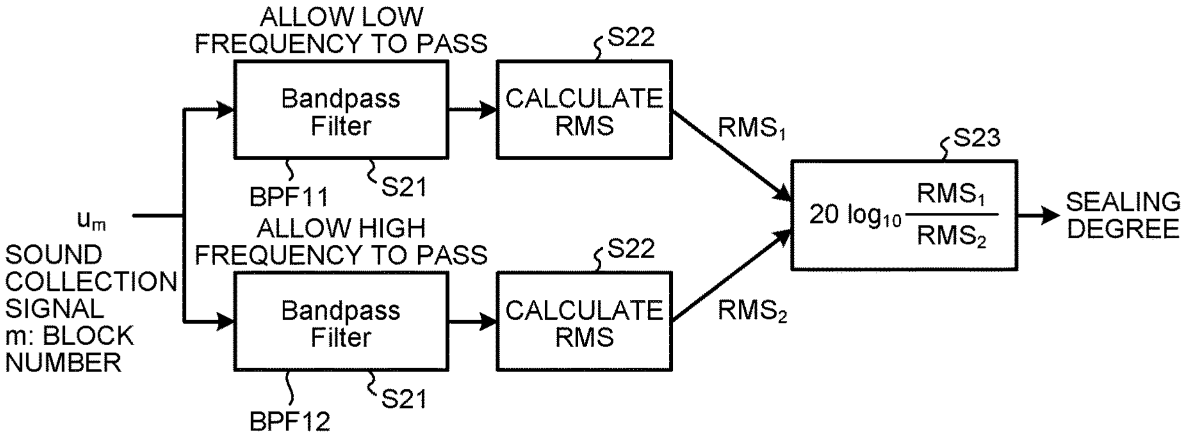
FIG. 5 is a diagram illustrating an example of a sealing degree measuring method (a time domain analysis) according to the embodiment.
Figure 6:
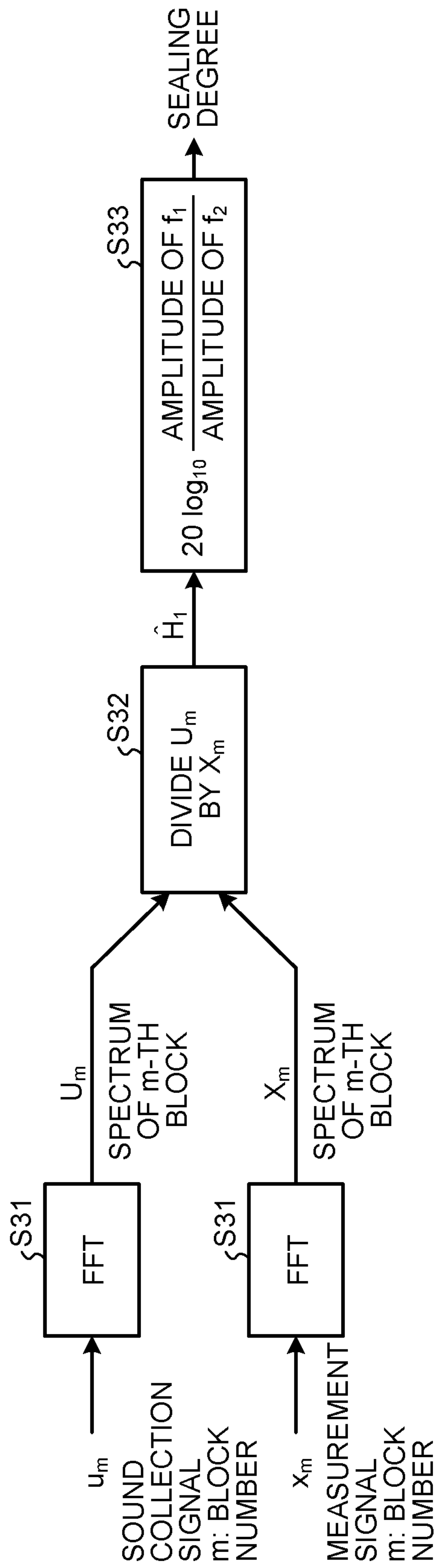
FIG. 6 is a diagram illustrating an example of a sealing degree measuring method of (an FFT analysis) according to the embodiment.

In the following explanation, an example of measurement of a sealing degree by the measuring unit 1121 is explained with reference to FIG. 5 and FIG. 6. FIG. 5 and FIG. 6 are examples based on the Formula (1) described above. Note that the examples illustrated in FIGS. 5 and 6 are examples and the present invention is not limited to these examples.

FIG. 5 illustrates an example of measuring a sealing degree in a time domain. It is assumed that a measurement signal collected by the microphone is processed for each of the N blocks. A block number is represented as m. The measurement signal collected by the microphone is represented as u_m. The measuring unit 1121 inputs u_m to two types of bandpass filters (a BPF 11 and a BPF 12) (S21). For example, the measuring unit 1121 inputs u_m to an inverse notch filter, which is a band pass filter having a narrow bandwidth. Note that it is assumed that the center frequency of the filter BPF 11 is a low frequency, for example, the frequency f1, and the center frequency of the filter BPF 12 is a high frequency, for example, the frequency f2. Subsequently, the measuring unit 1121 calculates a root mean square (RMS) value in each of the band pass filters (S22). Note that RMS values calculated by the measuring unit 1121 are represented as, for example, RMS 1 and RMS 2. The measuring unit 1121 calculates a sealing degree based on a ratio of RMS 1 and RMS 2 calculated in Step S22 (S23).

FIG. 6 illustrates an example of measuring a sealing degree in a frequency domain. Note that the same description as the explanation with reference to FIG. 5 is omitted as appropriate. A sound collection signal collected by the microphone is represented as u_m. The measurement signal output from the speaker is represented as x_m. The measuring unit 1121 executes fast fourier transform (FFT) on u_m and x_m (S31). Note that u_m and x_m on which the FFT is executed by the measuring unit 1121 are represented as, for example, Um and X m. U m and X m are spectra of an m-th block. Subsequently, the measuring unit 1121 calculates a ratio of FFT results calculated in Step S31 (S32). Specifically, the measuring unit 1121 calculates an estimated value of an ear canal frequency characteristic H1 by dividing the FFT result of u_m by the FFT result of x_m. The measuring unit 1121 calculates a sealing degree based on a ratio of an f1 component and an f2 component of the estimated value of the ear canal frequency characteristic H1 (S33).

The measuring unit 1121 measures, for each of the earphones 20, a sealing degree of the ear canal of the user by the plurality of earphones 20. For example, the measuring unit 1121 measures each of sealing degrees of the plurality of earphones 20 having different sizes of earpieces.

Determining Unit 1122

The determining unit 1122 has a function of determining an optimum earphone 20 based on the sealing degrees measured by the measuring unit 1121. For example, the determining unit 1122 determines, as the optimum earphone 20, the earphone 20 having the highest sealing degree among a plurality of earphones 20 having different predetermined sizes. For example, the determining unit 1122 determines the optimum earphone 20 out of a plurality of earphones 20 selected by the user.

Figure 7:
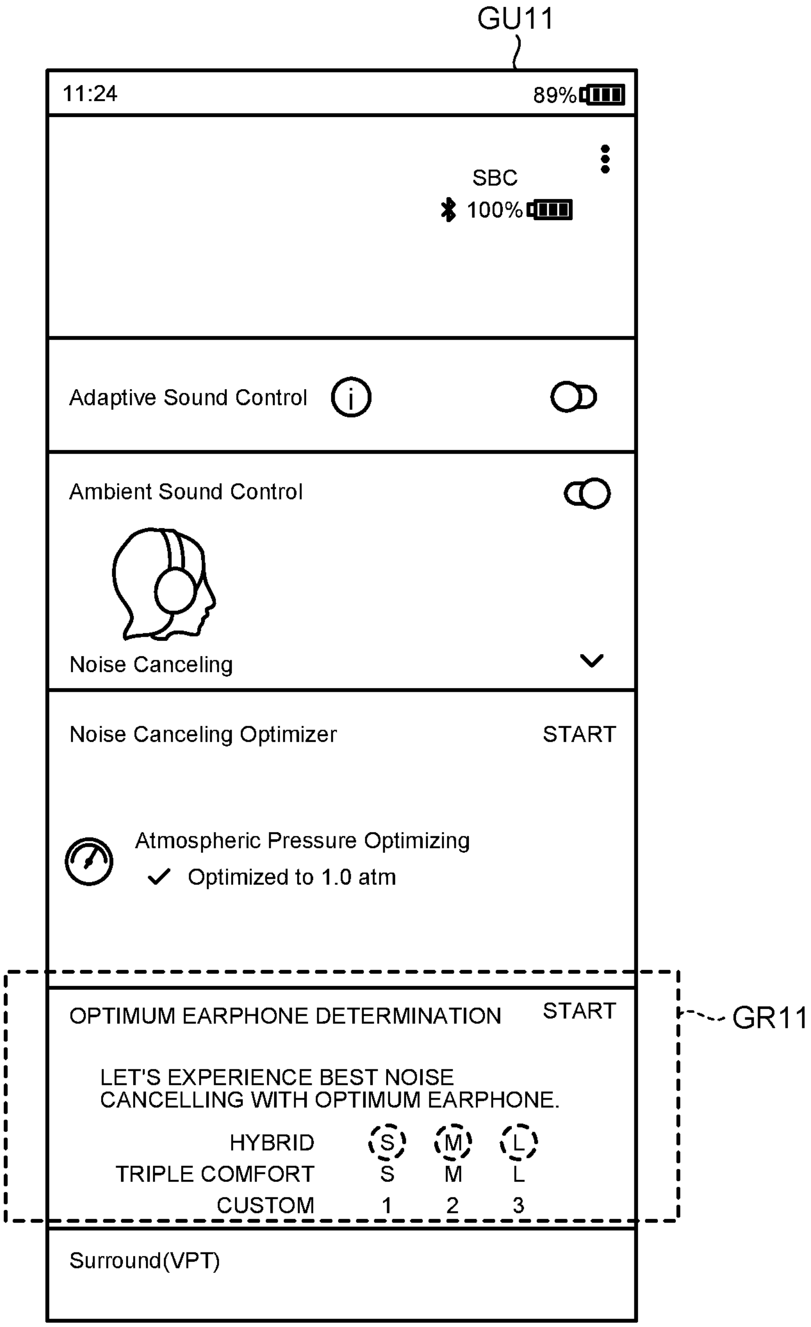
FIG. 7 is a diagram illustrating an example of a setting screen displayed according to determination processing according to the embodiment.

In the following explanation, an example of a GUI displayed by the terminal device 30 according to determination processing for the optimum earphone 20 by the determining unit 1122 is explained with reference to FIG. 7 to FIG. 9. FIG. 7 illustrates a setting screen (a screen GU11) of the earphone 20 set as a determination target. On a setting region (a region GR11) included in a screen GU11, the earphones 20 having a plurality of sizes set as determination targets are set. In FIG. 7, it is assumed that sizes of S, M, and L are set.

Figure 8:
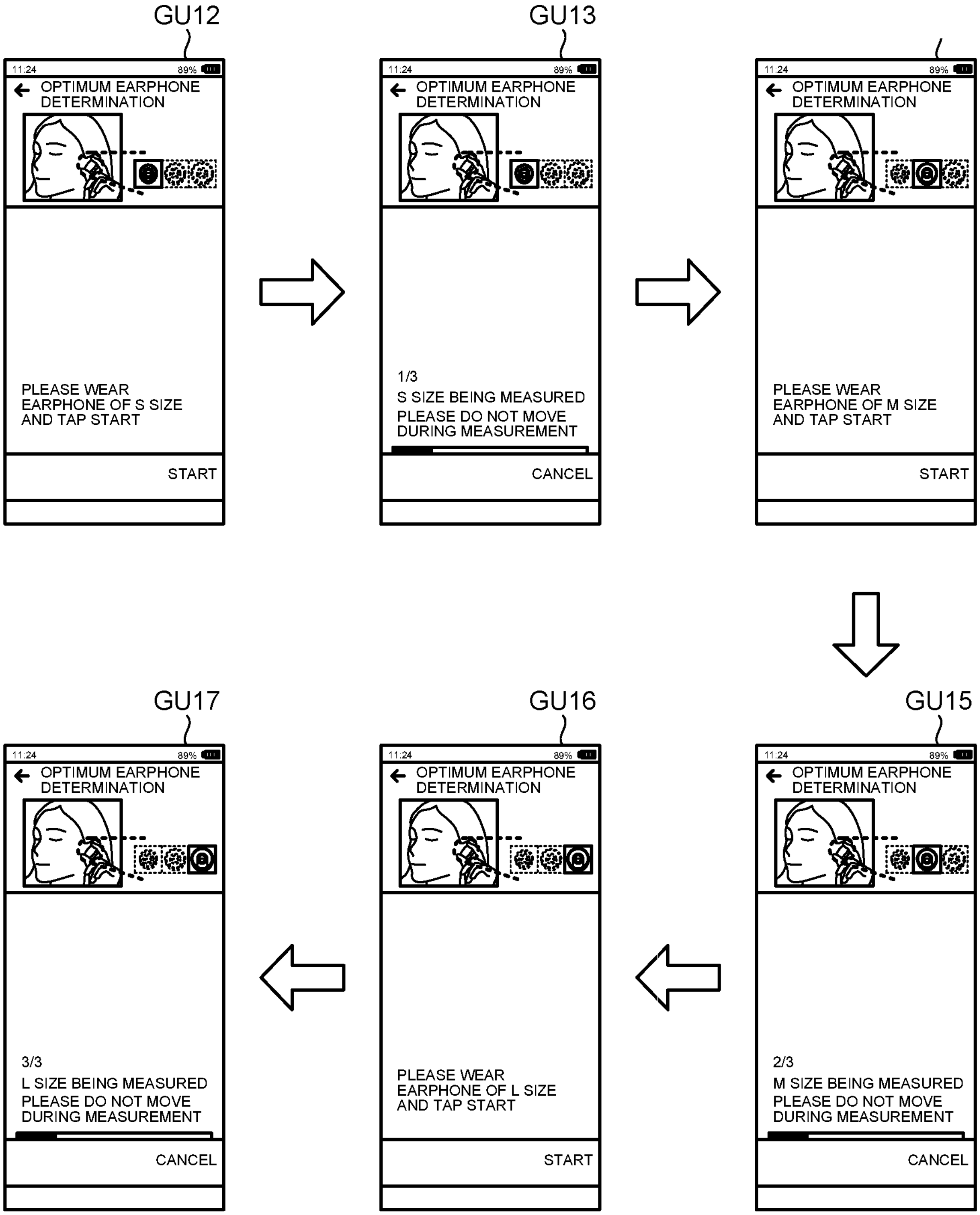
FIG. 8 is a diagram illustrating an example of an execution screen displayed according to the determination processing according to the embodiment.

FIG. 8 illustrates an execution screen for processing by the determining unit 1122. In FIG. 8, screens for urging the user to wear the earphone 20 of the sizes and tap a start of measurement is displayed. For example, the screens are a screen GU12, a screen GU14, and a screen GU16. In FIG. 8, screens indicating that processing for measuring sealing degrees is being executed in the sizes are displayed. For example, the screens are a screen GU13, a screen GU15, and a screen GU17.

Figure 9:
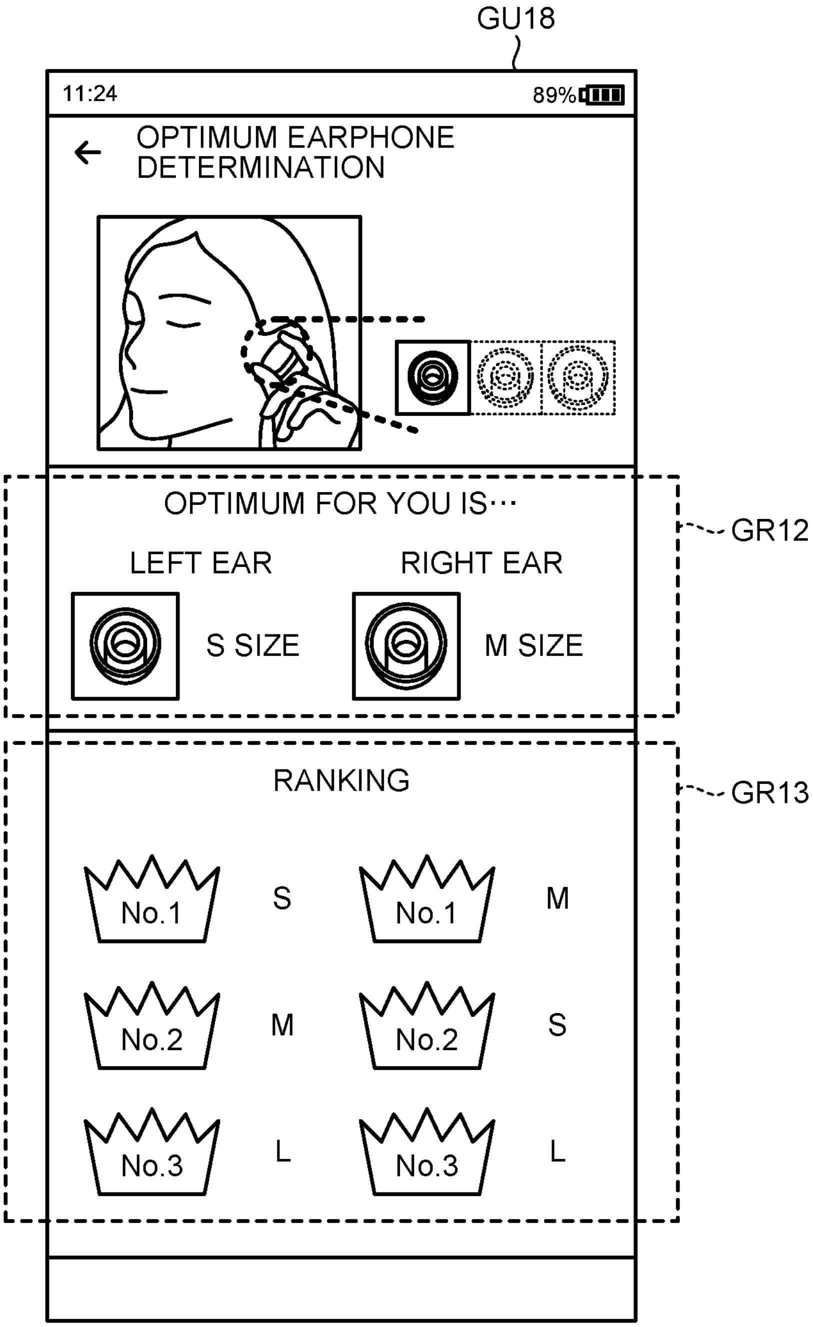
FIG. 9 is a diagram illustrating an example of an evaluation screen displayed according to the determination processing according to the embodiment.

FIG. 9 illustrates a determination result screen (a screen GU18) by the determining unit 1122. Optimum results are displayed in an evaluation region (a region GR12) included in the screen GU18. In FIG. 9, it is displayed that an optimum result for the left ear is the S size and an optimum result for the right ear is the M size. A ranking result is displayed on an evaluation region (a region GR13) included in the screen GU18. Note that, as the ranking result, all of measured sealing degrees may be displayed in descending order of the sealing degrees or sealing degrees may be displayed by narrowing down to three higher sealing degrees. A determination result is output by the output unit 113 explained below. Information concerning the determination result may be stored in the storing unit 120 explained below.

The determining unit 1122 has a function of determining an optimum wearing state of the earphone 20 by using a sealing degree of the determined optimum earphone 20 as a reference value (hereinafter referred to as "sealing reference value" as appropriate). The determining unit 1122 changes a wearing state of the earphone 20 to thereby determine the optimum wearing state. Specifically, the determining unit 1122 determines a wearing state in which a sealing degree is maximized. The determining unit 1122 determines, as an optimum wearing state, the wearing state in which the sealing degree is maximized. Note that the determining unit 1122 may determine a wearing state in which the absolute value of the sealing degree is maximized. In this case, the determining unit 1122 may determine, as the optimum wearing state, a wearing state in which the sealing degree is minimized. The determining unit 1122 determines whether the sealing degree exceeds a sealing reference value. Note that the optimum wearing state is a wearing state in which the sealing degree by the earphone 20 is maximized based on the shape of the earphone 20 and the shape of the ear of the user. The output unit 113 explained below performs processing for proposing an optimum wearing state to the user by moving the earphone 20 to maximize the sealing degree.

The determining unit 1122 changes a wearing angle of the earphone 20 as the wearing state to thereby determine, as an optimum wearing angle, a wearing angle at which the sealing degree is maximized. As another example, the determining unit 1122 changes a wearing depth of the earphone 20 to thereby determine, as an optimum wearing depth, a wearing depth at which the sealing degree is maximized.

Figure 10:
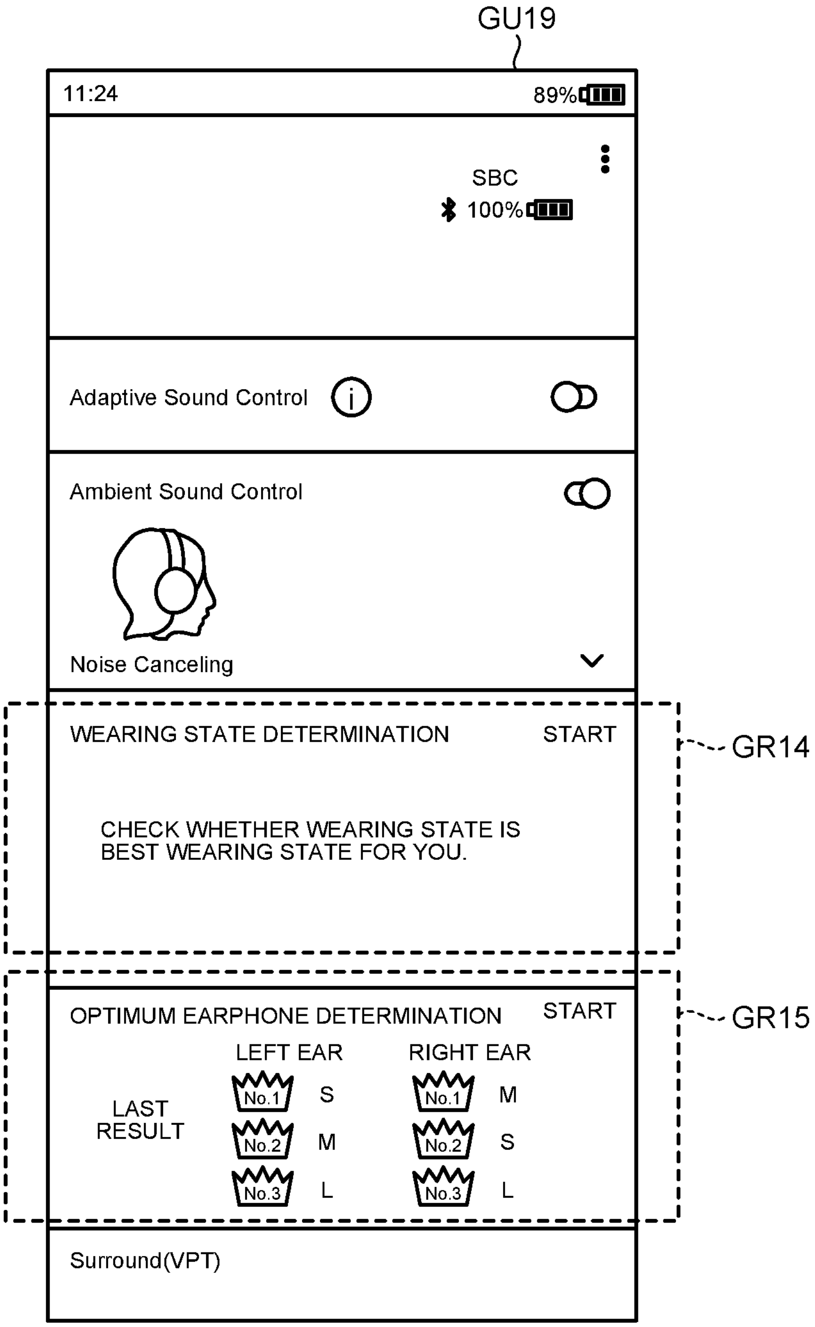
FIG. 10 is a diagram illustrating an example of a setting screen displayed according to the determination processing according to the embodiment.

In the following explanation, an example of a GUI displayed on the terminal device 30 according to determination processing for the optimum wearing state by the determining unit 1122 is explained with reference to FIG. 10 to FIG. 12. FIG. 10 illustrates a setting screen (a screen GU19) for a wearing state of the earphone 20. By tapping a start in a setting region (a region GR14) included in the screen GU19, the user executes determination of a wearing state. A determination result of the last time is displayed on an evaluation region (a region GR15) included in the screen GU19. For example, a ranking result of the last time is displayed. Note that a determination result based on any form may be displayed if the form is information indicating the determination result without being limited to the ranking. A different determination result may be displayed for each type of the earphone 20 as the determination result of the last time. Consequently, the information processing device 10 can cause the user to confirm a previous measurement result.

Figure 11:
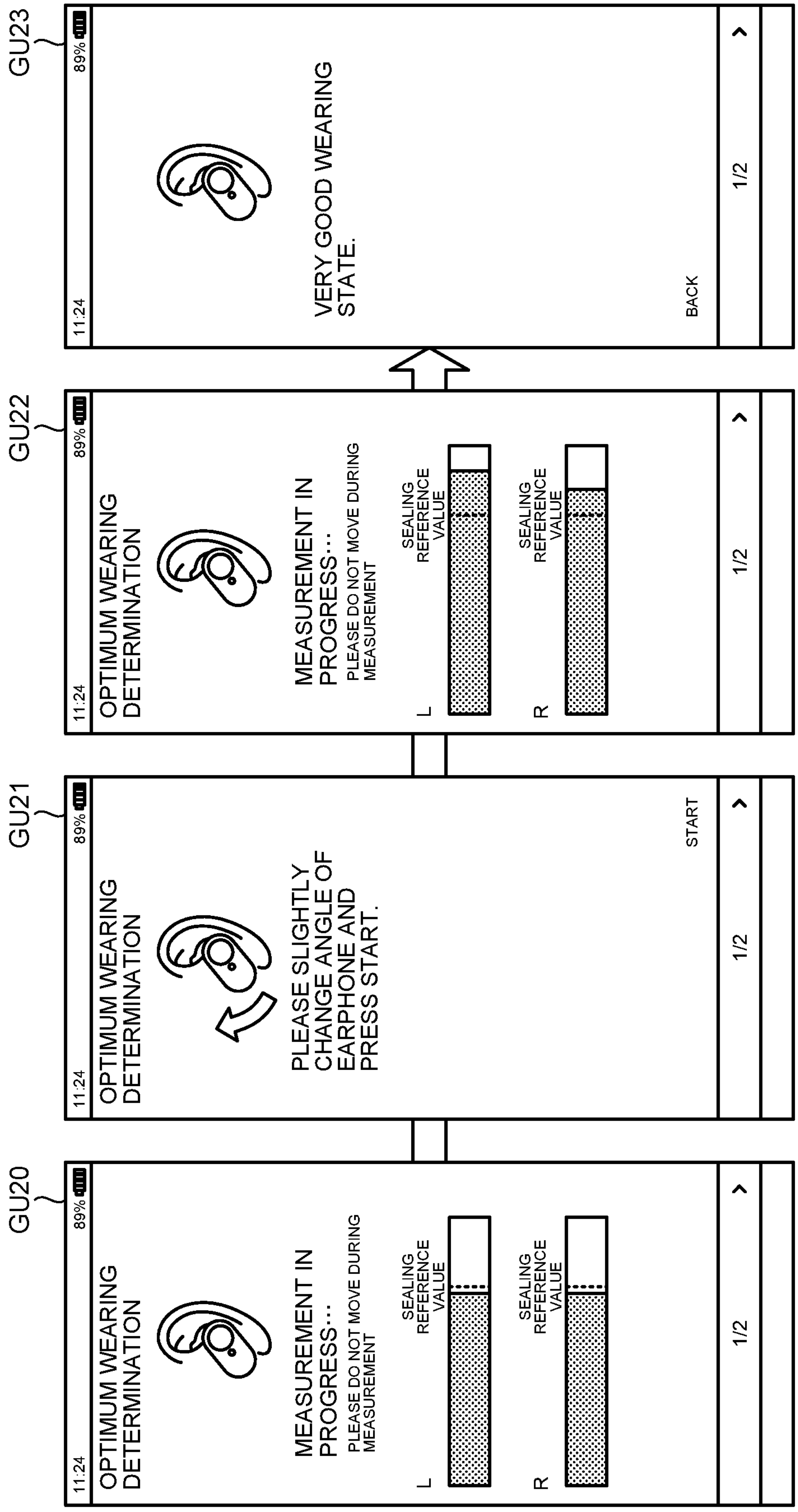
FIG. 11 is a diagram illustrating an example of an execution screen displayed according to the determination processing according to the embodiment.

FIG. 11 illustrates an execution screen for processing by the determining unit 1122. Here, the determining unit 1122 determines an optimum wearing angle as an optimum wearing state. For example, the determining unit 1122 determines an optimum wearing angle of the earphone 20 based on sealing degrees measured by moving the earphone 20 such that a wearing angle gradually changes. In FIG. 11, a screen for urging the user to tap a start for measuring a sealing degree is displayed by changing the wearing angle of the earphone 20. The screen is, for example, a screen GU21. In FIG. 11, screens indicating that processing for measuring a sealing degree is being executed at wearing angles are displayed. The screens are, for example, a screen GU20 and a screen GU22. On these screens, sealing degrees with respect to a sealing reference value are displayed. Note that the measured sealing degrees are displayed as indicators. In FIG. 11, the measured sealing degrees are displayed as the indicators. However, not only this example, but the sealing degrees may be displayed as anything and may be displayed in any form if indicators of the sealing degrees are shown.

In the screen GU20, each of sealing degrees of the left ear and the right ear of the user is the sealing reference value. For example, in the screen GU22, each of the sealing degrees of the left ear and the right ear of the user exceeds the sealing reference value. Note that, in the screen GU22, the sealing degrees of the left ear and the right ear of the user are different and the sealing degree of the left ear of the user is larger than the sealing degree of the right ear of the user. Since the sealing degree of the screen GU22 is the largest, the determining unit 1122 determines a wearing angle in the case of the screen GU22 as an optimum wearing angle.

Figure 12:
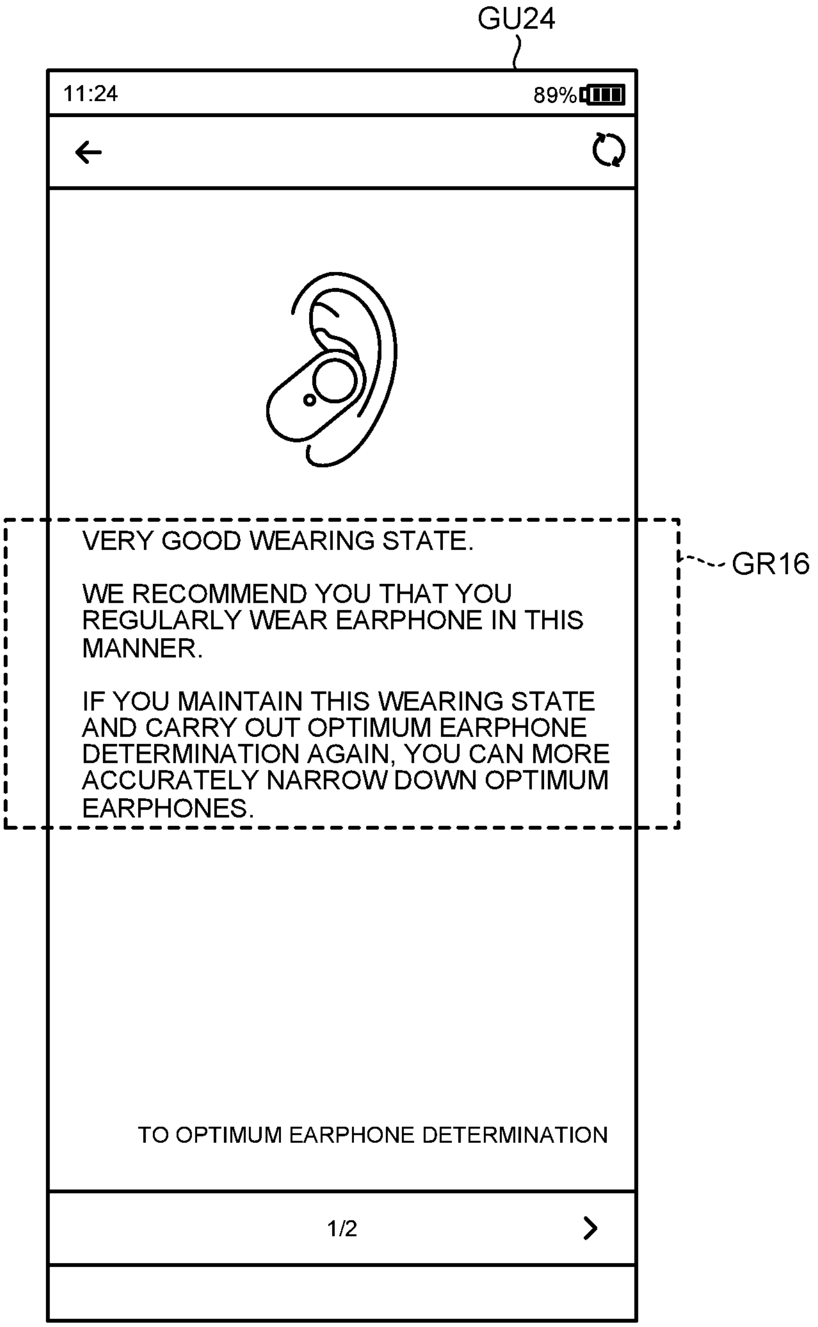
FIG. 12 is a diagram illustrating an example of an evaluation screen displayed according to the determination processing according to the embodiment.

FIG. 12 illustrates a determination result screen (a screen GU24) by the determining unit 1122. An optimum result is displayed on an evaluation region (a region GR16) included in the screen GU24. In FIG. 12, it is displayed that a wearing angle of wearing by the user is optimum in the case of the screen GU24. In FIG. 12, it is displayed that the user is urged to perform operation for executing the determination processing for the optimum earphone 20 again while keeping this wearing angle. Consequently, the information processing device 10 can improve the accuracy of the determination processing by the determining unit 1122.

Adjusting Unit 1123

The adjusting unit 1123 has a function of performing processing for adjusting sound quality. For example, the adjusting unit 1123 performs processing for adjusting sound quality according to the material quality (material) of the optimum support member determined by the determining unit 1122. For example, the adjusting unit 1123 may perform the processing according to the material of the support member determined as optimum by the determining unit 1122. For example, the adjusting unit 1123 performs processing for adjusting sound quality according to a material of the support member selected by the user. As an example of the processing for adjusting the sound quality, the adjusting unit 1123 may use, for example, noise cancelling. The adjusting unit 1123 may adjust the sound quality, for example, by adjusting a filter for adjusting the sound quality (for example, a sound quality adjustment filter or a noise cancelling filter). Any processing may be used if the processing is processing for adjusting the sound quality.

Here, a case in which the sound quality is adjusted using the sound quality adjustment filter as a filter set as a switching target other than the noise cancelling filter is explained. For example, when the filter is switched to a support member made of a urethane material, since the urethane material has a characteristic of exhibiting a different frequency characteristic (for example, a low frequency is likely to appear) compared with a support member made of another material (for example, a hybrid material), the adjusting unit 1123 may perform the processing for adjusting the sound quality by adding a filter that cancels a change caused by the characteristic (for example, a low frequency range is suppressed) to the switching target filter. As explained above, the adjusting unit 1123 may perform the processing for adjusting the sound quality by adding a filter corresponding to a characteristic of the sound quality to the switching target filter based on a characteristic of the sound quality of the support member based on the material of the support member.

Output Unit 113

The output unit 113 has a function of outputting a determination result by the determining unit 1122. The output unit 113 provides information concerning the determination result to, for example, the terminal device 30 via the communication unit 100. When receiving the output information provided from the output unit 113, the terminal device 30 displays the output information via an output unit 320. The output unit 113 may provide control information for displaying the output information. The output unit 113 may generate output information for displaying information concerning the determination result on the terminal device 30.

The output unit 113 provides, for example, information concerning a determination result of the optimum earphone 20 of the last time. The output unit 113 provides, for example, information concerning a sealing degree with respect to the sealing reference value. For example, the output unit 113 provides information concerning to which degree the sealing reference value is satisfied in wearing states.

After an optimum wearing state is determined, the output unit 113 provides information urging the user to perform operation for executing the determination processing of the optimum earphone 20 again while keeping the wearing state. Consequently, since the output unit 113 can improve the accuracy of the determination processing by the determining unit 1122, it is possible to promote further improvement in usability.

The output unit 113 provides control information for outputting warning display and warning sound. For example, when the sealing reference value is not exceeded in the wearing states, the output unit 113 provides the control information for outputting warning display or warning sound. Consequently, the output unit 113 can notify the user that the sound quality of sound provided from the earphone 20 is not improved. Therefore, it is possible to promote further improvement in usability.

(1-3) Storing Unit 120

The storing unit 120 is realized by, for example, a semiconductor memory element such as a random access memory (RAM) or a flash memory or a storage device such as a hard disk or an optical disk. The storing unit 120 has a function of storing a computer program and data (including a form of a program) concerning processing in the information processing device 10.

FIG. 13 illustrates an example of the storing unit 120. The storing unit 120 illustrated in FIG. 13 stores information concerning a determination result by the determining unit 1122. As illustrated in FIG. 13, the storing unit 120 may include items such as "determination result ID" and "determination result (optimum earphone)".

The "determination result ID" indicates identification information for identifying information concerning a determination result by the determining unit 1122. The "determination result (optimum earphone)" indicates a determination processing result of the optimum earphone 20 by the determining unit 1122.

(2) Earphone 20

As illustrated in FIG. 3, the earphone 20 includes a communication unit 200, a control unit 210, an output unit 220, and an input unit 230.

(2-1) Communication Unit 200

The communication unit 200 has a function of performing communication with an external device. For example, in communication with the external device, the communication unit 200 outputs information received from the external device to the control unit 210. Specifically, the communication unit 200 outputs information received from the information processing device 10 to the control unit 210. For example, the communication unit 200 outputs information concerning acquisition of information concerning measurement sound to the control unit 210.

(2-2) Control Unit 210

The control unit 210 has a function of controlling the operation of the earphone 20. For example, the control unit 210 transmits information concerning measurement sound measured by the earphone 20 to the information processing device 10 via the communication unit 200.

The control unit 210 may have a function of controlling the operation of the audio codec CD11. The control unit 210 may control the operation of the ADC, the DAC, or the amplifier included in the audio codec CD11.

(2-3) Output Unit 220

The output unit 220 is realized by a member capable of outputting a measurement signal such as a speaker. The output unit 220 is the first member according to the embodiment. The output unit 220 outputs a measurement signal.

(2-4) Input Unit 230

The input unit 230 is realized by a member capable of collecting a measurement signal such as a microphone. The input unit 230 is the second member according to the embodiment. The input unit 230 collects the measurement signal.

(3) Terminal Device 30

As illustrated in FIG. 3, the terminal device 30 includes a communication unit 300, a control unit 310, and an output unit 320.

(3-1) Communication Unit 300

The communication unit 300 has a function of communicating with the external device. For example, in the communication with the external device, the communication unit 300 outputs information received from the external device to the control unit 310. Specifically, the communication unit 300 outputs information concerning a determination result received from the information processing device 10 to the control unit 310.

(3-2) Control Unit 310

The control unit 310 has a function of controlling the overall operation of the terminal device 30. For example, the control unit 310 performs processing for controlling output of information concerning a determination result.

(3-3) Output Unit 320

The output unit 320 has a function of outputting information concerning a determination result. The output unit 320 outputs the output information provided from the output unit 113 via the communication unit 300. For example, the output unit 320 displays the output information on a display screen of the terminal device 30. The output unit 320 may output the output information based on the control information provided from the output unit 113.

<2.3. Processing of the Information Processing System>

The functions of the information processing system 1 according to the embodiment are explained above. Subsequently, processing of the information processing system 1 is explained.

(1) Processing 1 in the Information Processing Device 10: Measurement of a Sealing Degree (a Time Domain Analysis)

Figure 14:
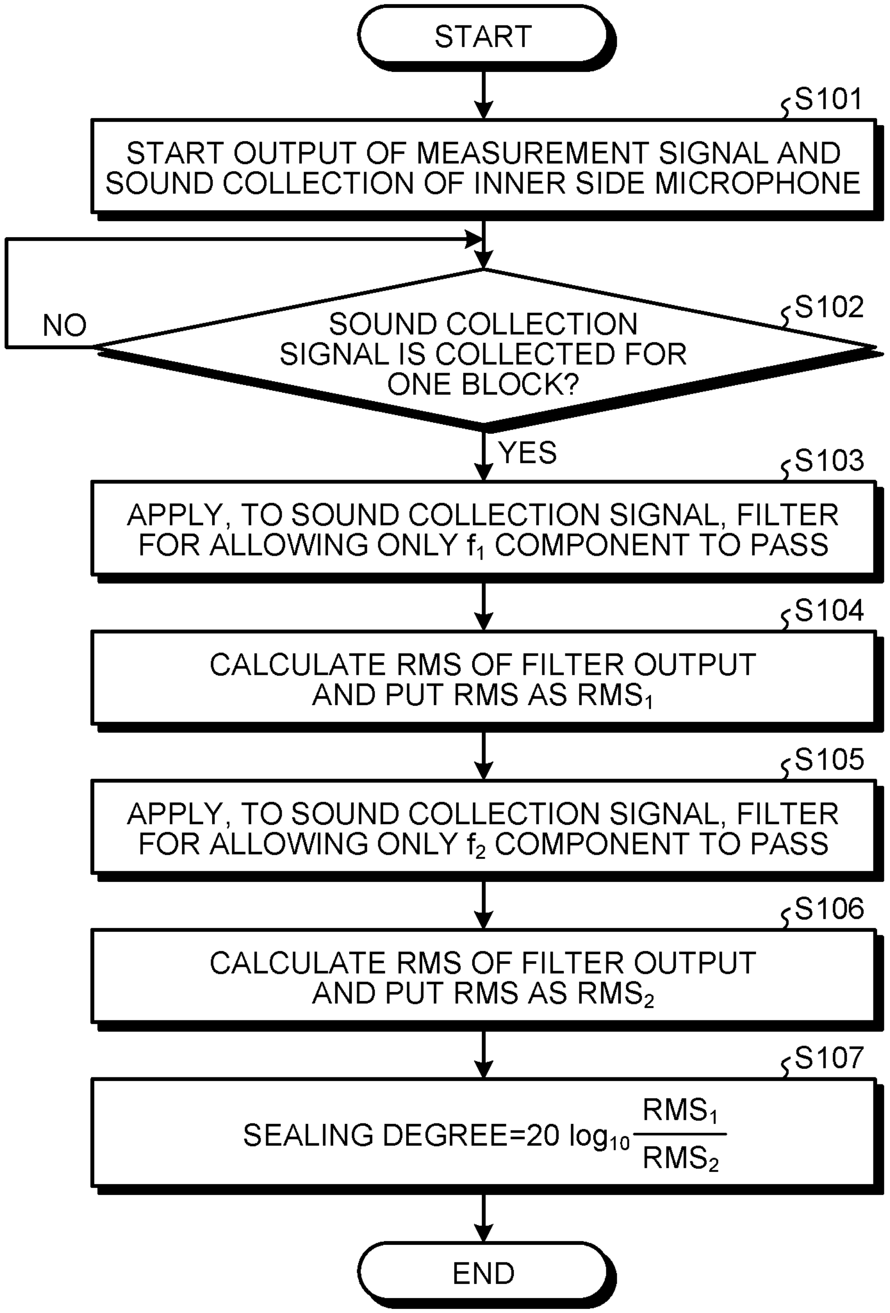
FIG. 14 is a flowchart illustrating a flow of processing of sealing degree measurement (a time domain analysis) in an information processing device according to the embodiment.

FIG. 14 is a flowchart illustrating a flow of processing of measurement of a sealing degree (a time domain analysis) in the information processing device 10 according to the embodiment. The Information processing device 10 transmits, to the earphone 20, control information for starting output of a measurement signal and sound collection. When receiving the control information, the earphone 20 starts output of a measurement signal and sound collection based on the received control information (S101). Subsequently, the information processing device 10 determines whether or not a sound collection signal for one block is acquired (S102). One block referred to herein means a sound collection signal collected by a microphone or the like and sampled at a predetermined number of sampling points according to a sampling frequency. When determining that the sound collection signal for one block is not acquired (S102; NO), the information processing device 10 stays on standby until the sound collection signal for one block is acquired. When determining that the sound collection signal for one block is acquired (S102; YES), the information processing device 10 applies a filter that allows only the f1 component to pass to the acquired sound collection signal (S103). Subsequently, after applying the filter, the information processing device 10 calculates an RMS value of the f1 component (S104). Subsequently, the information processing device 10 applies a filter that allows only the f2 component to pass to the acquired sound collection signal (S105). Subsequently, the information processing device 10 calculates an RMS value of the f2 component after applying the filter (S106). The information processing device 10 calculates a sealing degree using the following Formula (2) (S107).

$$\text{Sealing degree} = 20 \times \log_{10} \frac{RMS_1}{RMS_2} \tag{2}$$

(2) Processing 2 in the Information Processing Device 10: Measurement of a Sealing Degree (an FFT Analysis)

Figure 15:
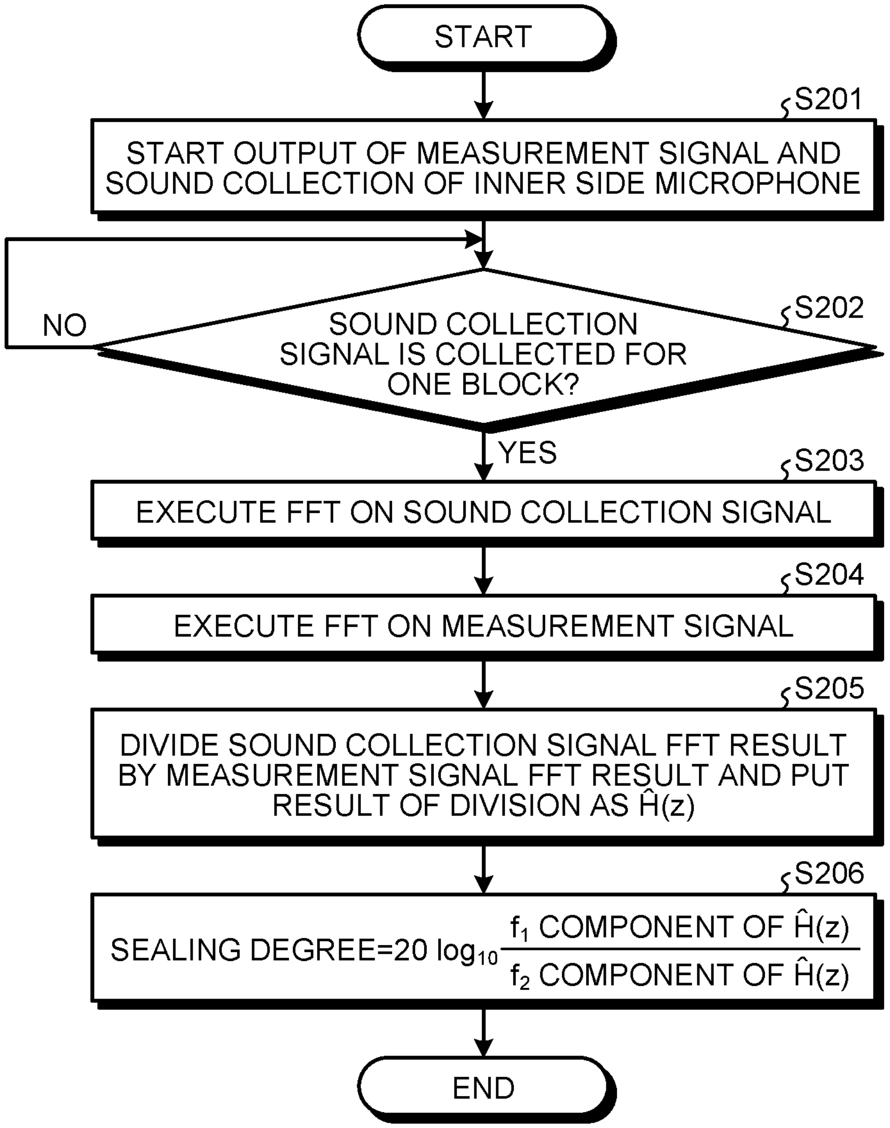
FIG. 15 is a flowchart illustrating a flow of processing of sealing degree measurement (an FFT analysis) in the information processing device according to the embodiment.

FIG. 15 is a flowchart illustrating a flow of processing of measurement of a sealing degree (an FFT analysis) in the information processing device 10 according to the embodiment. Note that the same explanation as the explanation with reference to FIG. 14 is omitted as appropriate. Since processing in Step S201 and Step S202 is the same as the processing in Step S101 and Step S102, explanation of the processing is omitted. When determining that a sound collection signal for one block has been acquired (S202; YES), the information processing device 10 executes FFT on the acquired sound collection signal (S203). Subsequently, the information processing device 10 executes FFT on a measurement signal (S204). Subsequently, the information processing device 10 divides an FFT result of the sound collection signal by an FFT result of the measurement signal (S205). The information processing device 10 calculates a sealing degree using the following Formula (3) (S206).

$$\text{Sealing degree} = 20 \times \log_{10} \frac{f_1 \text{ component of } \hat{H}(z)}{f_2 \text{ component of } \hat{H}(z)} \tag{3}$$

(3) Processing 3 in the Information Processing Device 10

Figure 16:
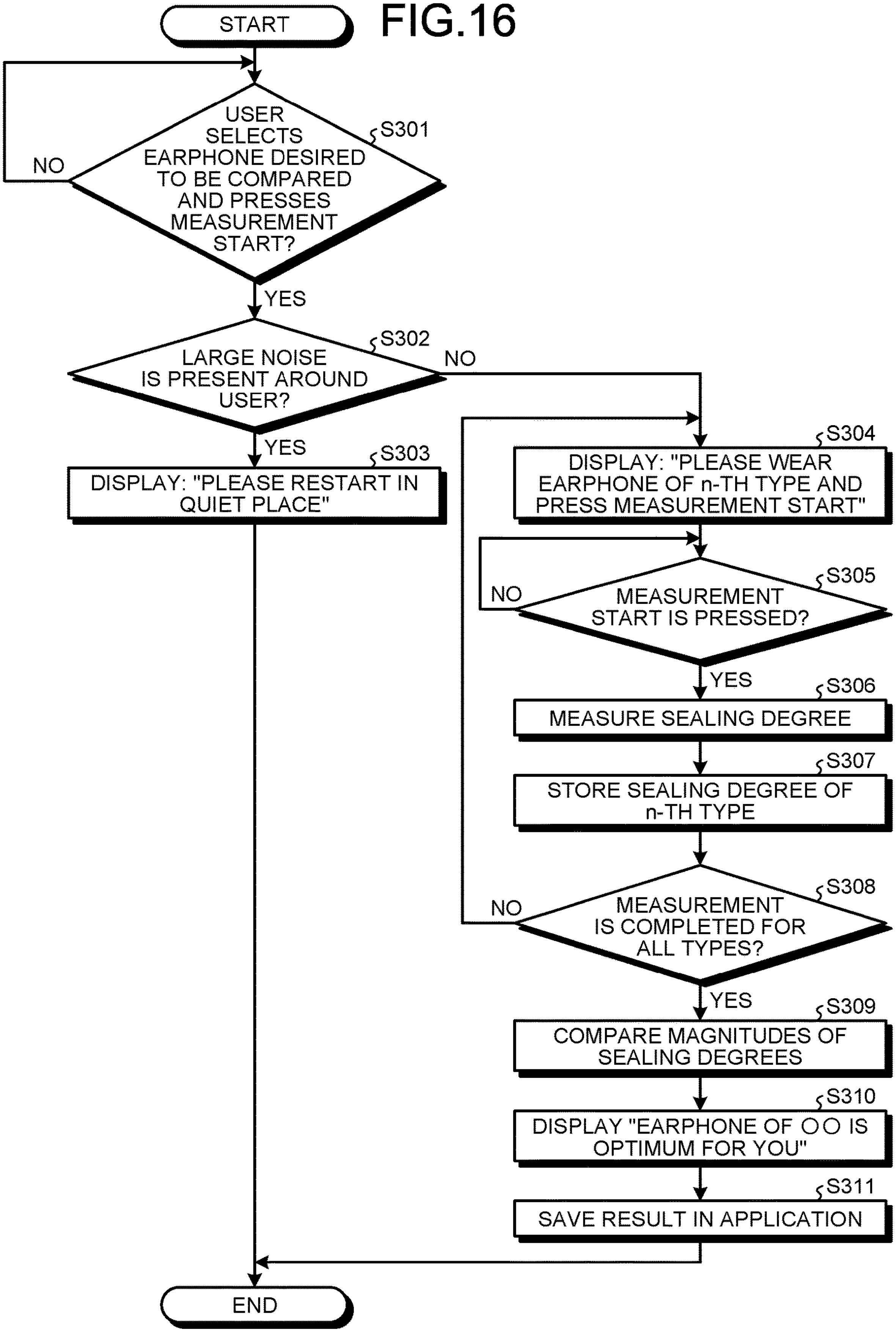
FIG. 16 is a flowchart illustrating a flow of determination processing in the information processing device according to the embodiment.

FIG. 16 is a flowchart illustrating a flow of determination processing in the information processing device 10 according to the embodiment. Note that, in FIG. 16, it is assumed that the information processing device 10 is combined with a device including a display device such as a smartphone or an audio player. The information processing device 10 determines whether the user has selected the earphones 20 desired to be compared and started measurement (Step S301). When determining that the user has not started measurement (Step S301; NO), the information processing device 10 stays on standby until the user selects the earphones 20 desired to be compared and starts measurement. When determining that the user has started measurement (Step S301; YES), the information processing device 10 determines whether noise (for example, noise equal to or greater than a predetermined threshold) is present around the user (S302). When determining that noise is present around the user (S302; YES), the information processing device 10 performs processing for outputting display for restarting the measurement in a quiet place (S303) and ends the information processing. When determining that noise is absent around the user (S302; YES), the information processing device 10 performs processing for outputting display for urging the user to wear a predetermined earphone 20 designated by a n-th type or the like and start measurement (S304). Subsequently, the information processing device 10 determines whether the user has started measurement in response to the display for urging the start of measurement (S305). When determining that the user has not started measurement (S305; NO), the information processing device 10 stays on standby until the user starts measurement. When determining that the user has started measurement (Step S305; YES), the information processing device 10 measures a sealing degree (S306). Subsequently, the information processing device 10 stores the measured sealing degree as a sealing degree of the predetermined earphone 20 designated by the n-th type or the like (S307). The information processing device 10 determines whether sealing degrees have been measured for all the earphones 20 indicated by n types or the like (S308). When determining that sealing degrees have not been measured for all the earphones 20 (S308; NO), the information processing device 10 returns to the processing in Step S304. When determining that sealing degrees have been measured for all the earphones 20 (Step S308; YES), the information processing device 10 executes comparison of magnitudes of the sealing degrees of all the earphones 20 (S309). Subsequently, the information processing device 10 performs, based on the comparison between the magnitudes of the sealing degrees, processing for outputting display indicating that the earphone 20 having the largest sealing degree is recommended as an optimum earphone 20 (S310). The information processing device 10 stores information concerning a determination result concerning the optimum earphone 20 (S311). Note that, in the processing in Step S310, for example, the information processing device 10 may perform processing for displaying information concerning the earphones 20 in descending order of the sealing degrees or may perform processing for displaying information concerning top three earphones 20 having high sealing degrees.

(4) Processing 4 in the Information Processing Device 10

Figure 17:
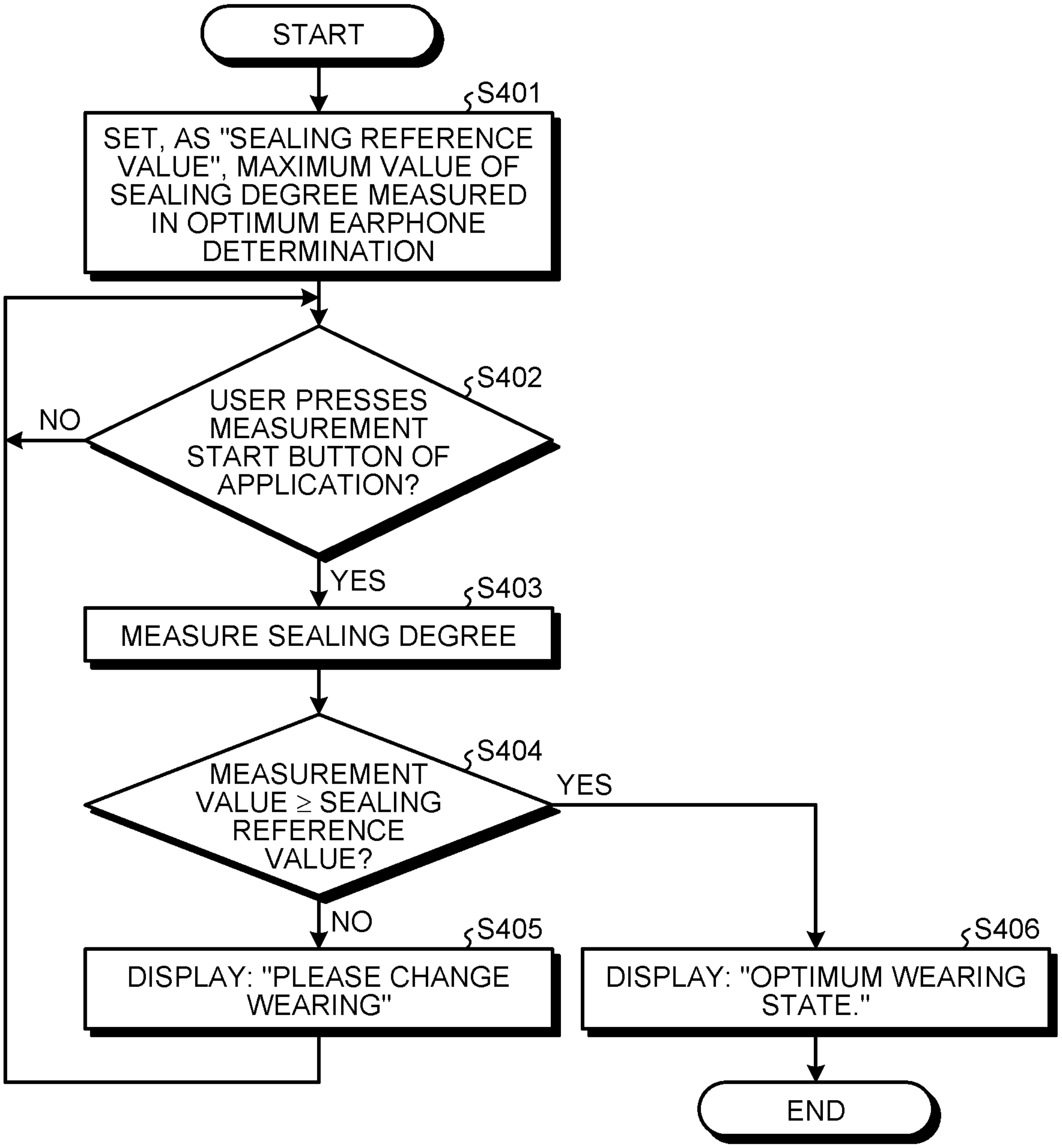
FIG. 17 is a flowchart illustrating a flow of determination processing in the information processing device according to the embodiment.

FIG. 17 is a flowchart illustrating a flow of determination processing in the information processing device 10 according to the embodiment. Note that, in FIG. 17, it is assumed that the information processing device 10 is combined with a device including a display device such as a smartphone or an audio player. The information processing device 10 sets, as a sealing reference value, a maximum value of a sealing degree measured in the determination processing for the optimum earphone 20 explained above (S401). Subsequently, the information processing device 10 determines whether the user has started measurement of a sealing degree in any wearing state (S402). When determining that the user has not started measurement of a sealing degree (S402; NO), the information processing device 10 stays on standby until the user starts measurement. When determining that the user has started measurement of a sealing degree (S402; YES), the information processing device 10 measures a sealing degree (S403). Subsequently, the information processing device 10 compares the measured sealing degree (a measured value) and the sealing reference value and determines whether the measured value is equal to or larger than the sealing reference value (S404). When determining that the measured value is smaller than the sealing reference value (S404; NO), the information processing device 10 performs processing for outputting display for urging the user to change the wearing state (S405) and returns to the processing in Step S402. When determining that the measured value is equal to or larger than the sealing reference value (S404; YES), the information processing device 10 performs processing for outputting display indicating that the wearing state is optimum (S406).

<2.4. Variations of Processing>

The embodiment of the present disclosure is explained above. Subsequently, variations of the processing in the embodiment of the present disclosure are explained. Note that the variations of the processing explained below may be applied to the embodiment of the present disclosure alone or may be applied to the embodiment of the present disclosure in combination. The variations of the processing may be applied instead of the configuration explained in the embodiment of the present disclosure or may be additionally applied to the configuration explained in the embodiment of the present disclosure.

(1) Overview of Functions of the Information Processing System 1 Using ANC

In the embodiment explained above, the information processing system 1 includes the speaker that outputs the measurement signal and the microphone that collects the measurement signal. For example, in FIG. 2, the information processing system 1 includes the speaker SP11 and the microphone MC11. In the following explanation, a microphone that collects a measurement signal is referred to as "first microphone" as appropriate. Here, the information processing system 1 is not limited to the example illustrated in FIG. 2 and may include, separately from the first microphone, a microphone (hereinafter referred to as "second microphone" as appropriate) that collects sound around the user U11. Here, the second microphone is an example of a second member capable of collecting sound around the user U11. Note that, for example, the second microphone is provided to face the outside of the earphone 20. Like the first microphone, a plurality of second microphones may be included in the information processing system 1.

Figure 18:
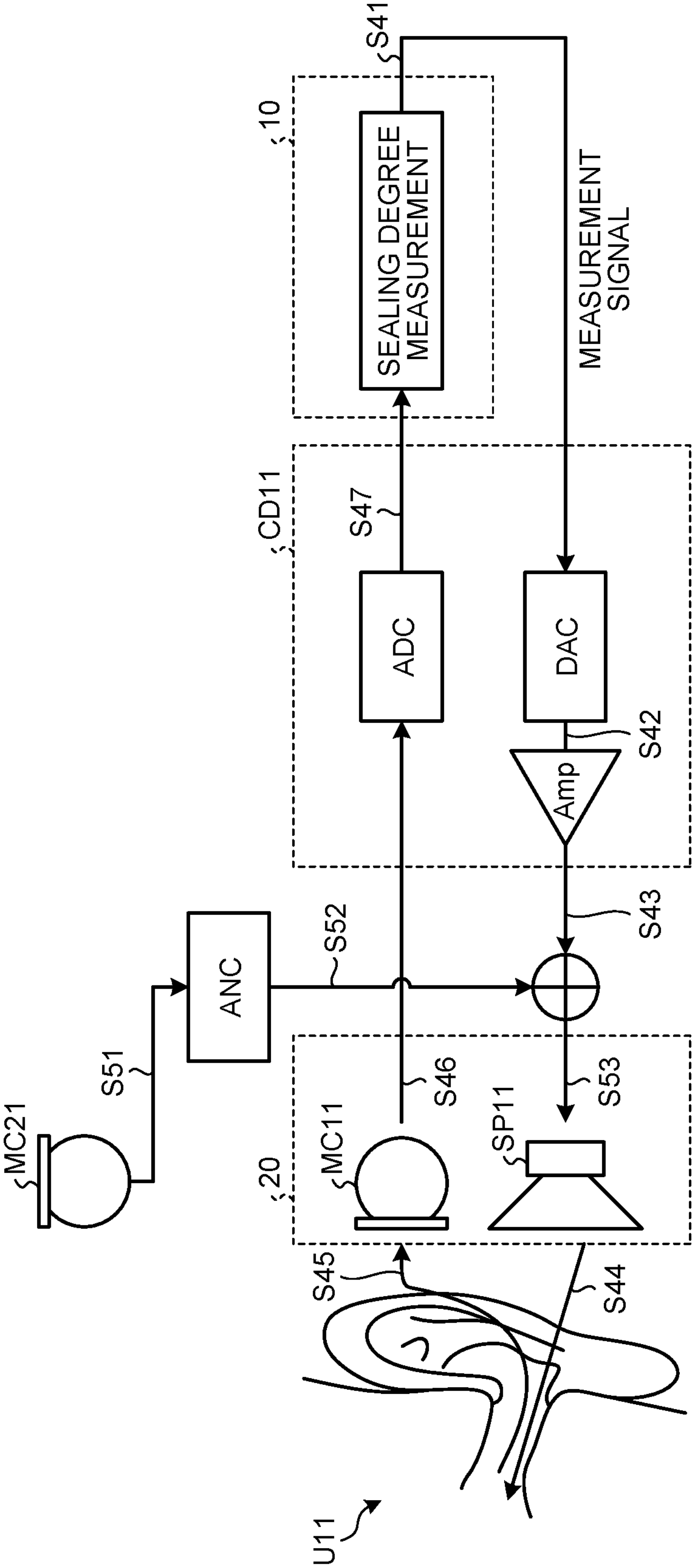
FIG. 18 is a diagram illustrating an overview of functions of an information processing system according to a modification of the embodiment.

FIG. 18 is a diagram illustrating an overview of functions of the information processing system 1 using active noise cancelling (ANC). Note that the same description as the explanation with reference to FIG. 2 is omitted as appropriate. Specifically, since processing in Step S41 to Step S47 is the same as the processing in Step S11 to Step S17, explanation of the processing is omitted. The information processing system 1 collects sound around the user U11 with a second microphone MC21 (S51). Note that the sound collected by the second microphone MC21 is hereinafter referred to as "second sound collection signal" as appropriate. Subsequently, the information processing system 1 executes, based on the second sound collection signal, ANC on a measurement signal amplified by an amplifier (S52). The information processing system 1 adds a noise cancellation signal generated by ANC processing to the measurement signal amplified by the amplifier (S53). Consequently, since the information processing system 1 can simultaneously output the measurement signal and the noise cancellation signal from the speaker SP11, the information processing system 1 can execute the measurement while cancelling peripheral noise mixed in the ear canal.

The information processing system 1 according to the modification can be applied when the user U11 is outdoors. For example, increasing volume of the measurement signal in order to increase S/N (Signal to Noise) of the measurement signal collected by the first microphone under a noise environment is sometimes inappropriate because of a reason such as a burden on the ear of user U11. The information processing system 1 according to the modification compares, using the ANC, sound information (for example, noise levels or spectra) of measurement signals collected by the first microphone and the second microphone. Here, if the ear canal of the user U11 is sealed, the sound information collected by the first microphone with the ANC becomes small. If sound is leaking, the sound information collected by the first microphone remains large. The information processing system 1 compares sound information of the measurement signal collected by the first microphone and the second microphone to determine a sealed state of the ear canal of the user U11 by the earphone 20. Alternatively, the information processing system 1 determines a sound leaking state by the earphone 20.

The determining unit 1122 may determine a peripheral sound level. For example, the determining unit 1122 may determine whether the peripheral sound level is equal to or higher than a predetermined threshold. When the peripheral sound level is equal to or higher than the predetermined threshold, the determining unit 1122 may determine to stop the measurement of a sealing degree. Consequently, the information processing system 1 can reduce possibility of providing a wrong sealing degree to the user because of disturbance. When the peripheral sound level is lower than the predetermined threshold, the determining unit 1122 may determine to perform measurement of a sealing degree.

When the sealing degree becomes equal to or lower than the predetermined threshold during sound output, the determining unit 1122 may determine that the sealing degree decreases and the effect of the ANC cannot be sufficiently exhibited. When determining that the effect of the ANC cannot be sufficiently exhibited, the determining unit 1122 may determine to stop the execution of the noise cancelling. Consequently, the information processing system 1 can reduce power consumption of the earphone 20.

(2) Types of the Earphone 20

In the embodiment explained above, the information processing device 10 determines the optimum earphone 20 out of the plurality of earphones 20 having the different sizes. Here, the information processing device 10 may determine the optimum earphone 20 out of a plurality of earphones 20 not only having the different sizes but also of different types. Note that the types are not limited to types in the case of different structures or different characteristics and may be, for example, types in the case of different brands (other companies' properties and custom properties) or the like. The types may be, for example, types in a hybrid relation having characteristics of different two or more types of material quality (materials). In this case, the acquiring unit 111 acquires information concerning a plurality of earphones 20 of different types. The determining unit 1122 determines, as the optimum earphone 20, the earphone 20 having the highest sealing degree among a plurality of earphones 20 of predetermined different types.

(3) User Interface

In the embodiment explained above, the information processing device 10 calculates the sealing degree based on the information concerning the measurement sounds measured by the plurality of earphones 20 having the different sizes. Here, the information processing device 10 may acquire information concerning a plurality of earphones 20 selected by the user on the GUI via, for example, the terminal device 30. In this case, the acquiring unit 111 acquires the information concerning the plurality of earphones 20 selected by the user. The measuring unit 1121 measures each of sealing degrees by the selected plurality of earphones 20. The determining unit 1122 determines, as the optimum earphone 20, the earphone 20 having the highest sealing degree among the selected plurality of earphones 20.

In the following explanation, processing from selection of a support member on the GUI to determination of a parameter of sound adjustment (for example, a filter (coefficient)) is described with reference to FIGS. 19A, 19B, 19C, 20, 21A, 21B, and 22.

Figures 19A, 19B, 19C:
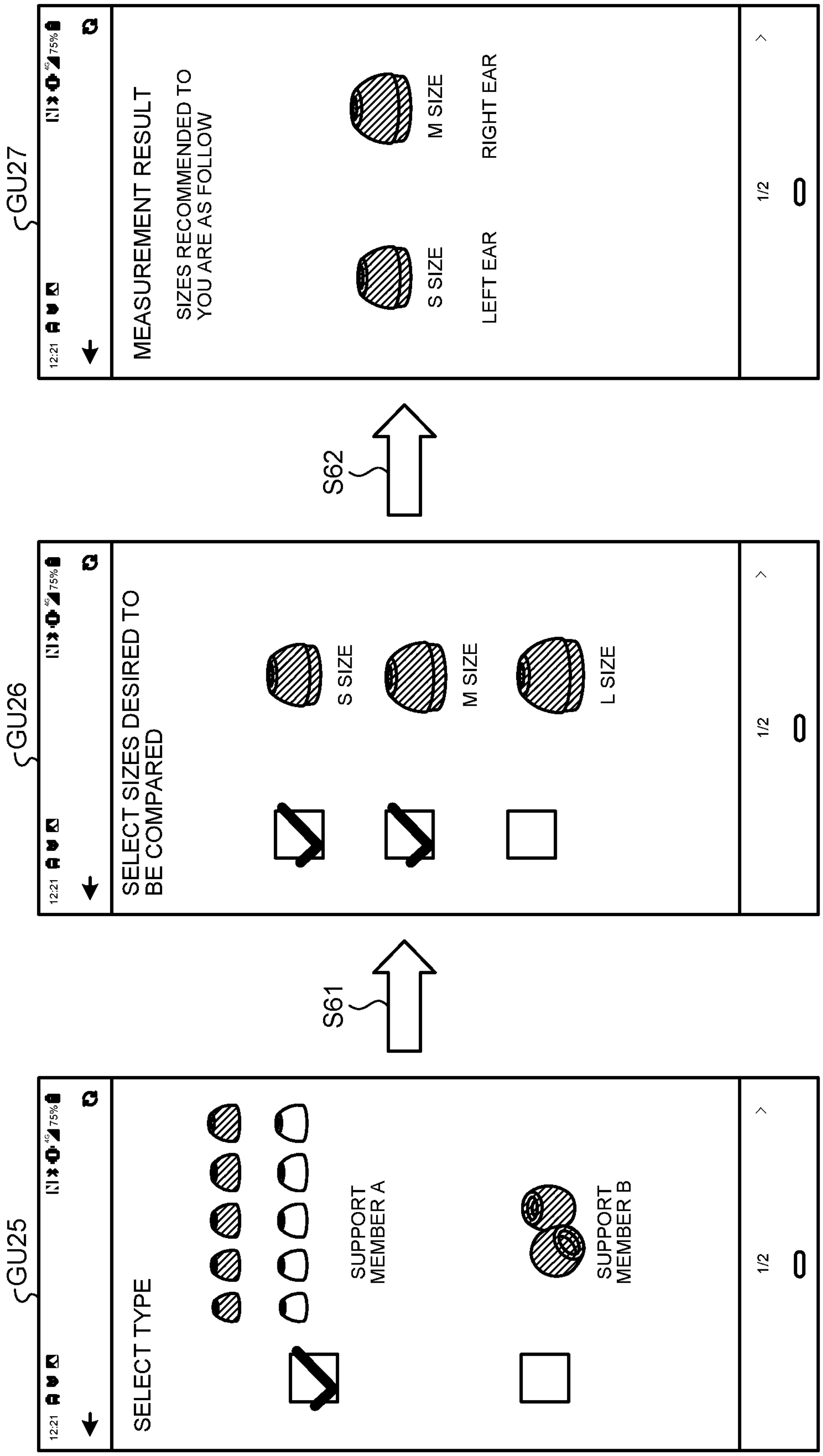
FIGS. 19A, 19B, and 19C are diagrams illustrating an example of filter switching processing according to the embodiment.

FIGS. 19A, 19B, and 19C are diagrams illustrating processing for adjusting sound quality according to a type of a support member selected by the user. In FIGS. 19A, 19B, and 19C, first, the user is caused to select either one of two types of support members made of different materials. Therefore, comparison of sealing degrees between materials of the support members is not performed. The information processing system 1 displays screen information for causing the user to select a type of a support member on the GUI. Note that, in FIGS. 19A, 19B, and 19C, a check mark is shown on the support member selected by the user. However, anything may be used if the selection by the user is clearly indicated. FIG. 19A illustrates a case in which a screen GU25 showing two types of support members (a support member A and a support member B) made of different materials is displayed on the GUI and the user selects the support member A. In this case, the check mark is added to the selected support member A. Here, the support member A and the support member B made of the different materials are, for example, support members of a hybrid material or support members of a urethane material. In the present embodiment, the support members made of the different materials displayed on the GUI are the two types of the support member A and the support member B. However, not only this, three or more types of support members may be displayed. The information processing system 1 acquires information concerning a size set as a comparison target of the selected support member A and displays a screen GU26 (S61). FIG. 19B illustrates a case where the screen GU26 showing three types of support members A (an S size, an M size, and an L size) having different sizes of the support member A selected by the user is displayed on the GUI and the user selects the support members A of the S size and the M size. Note that the sizes may be more or less than the three types (the S size, the M size, and the L size). For example, the sizes may be five types of (an SS size, an S size, an M size, an L size, and an XL size) and two types of (an S size, an M size) may be used. In this case, the check mark is added to the support members A of the selected S and M sizes. The information processing system 1 measures sealing degrees of the support members A of the selected S and M sizes in both the ears of the user and displays a screen GU27 (S62). FIG. 19C illustrates a case in which the screen GU27 showing a measurement result of sealing degrees is displayed. The information processing system 1 determines, based on the measurement result, the support members A of the S size and the M size as support members respectively corresponding to the ears (left ear and right ear) of the user. Note that, for example, the information processing system 1 may change the noise cancelling filter to a filter of the material of the support member A selected by the user on the screen GU25. At this time, the information processing system 1 may not display, on the GUI, to the effect that the filter is changed to the filter of the material of the support member A.

Figure 20:
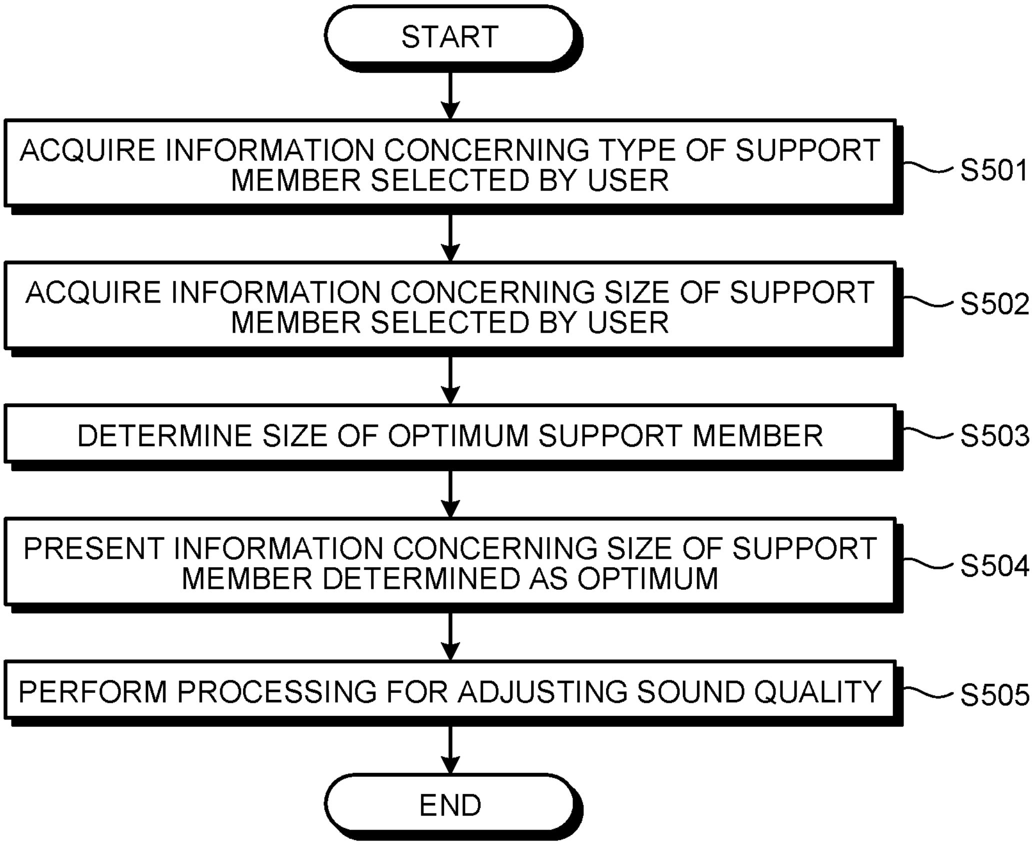
FIG. 20 is a flowchart illustrating a flow of sound quality adjustment processing in the information processing device according to the embodiment.

FIG. 20 is a flowchart illustrating a flow of sound quality adjustment processing in the information processing device 10 illustrated in FIGS. 19A, 19B, and 19C. The information processing device 10 acquires information concerning types of a support member set as a measurement target selected by the user (S501). At this time, the information processing device 10 may store the acquired information concerning the type of the support member. Then, the information processing device 10 acquires information concerning a size of the support member set as the measurement target selected by the user out of the sizes of the types of the support member selected by the user (S502). The information processing device 10 determines a size of the optimum support member based on comparison of sealing degrees in the size of the selected support member (S503). For example, the information processing device 10 determines the size of the optimum support member based on the processing illustrated in FIG. 16. Then, the information processing device 10 performs processing for presenting information concerning the size of the support member determined as optimum (S504). For example, the information processing device 10 performs processing for presenting display such as "A support members of o o size is optimum for you" or presenting the display to the user by voice. The information processing device 10 performs processing for adjusting sound quality based on the type of the support member determined as optimum (S505). For example, the information processing device 10 adjusts the sound quality adjustment filter and the noise cancelling filter.

Figures 21A, 21B:
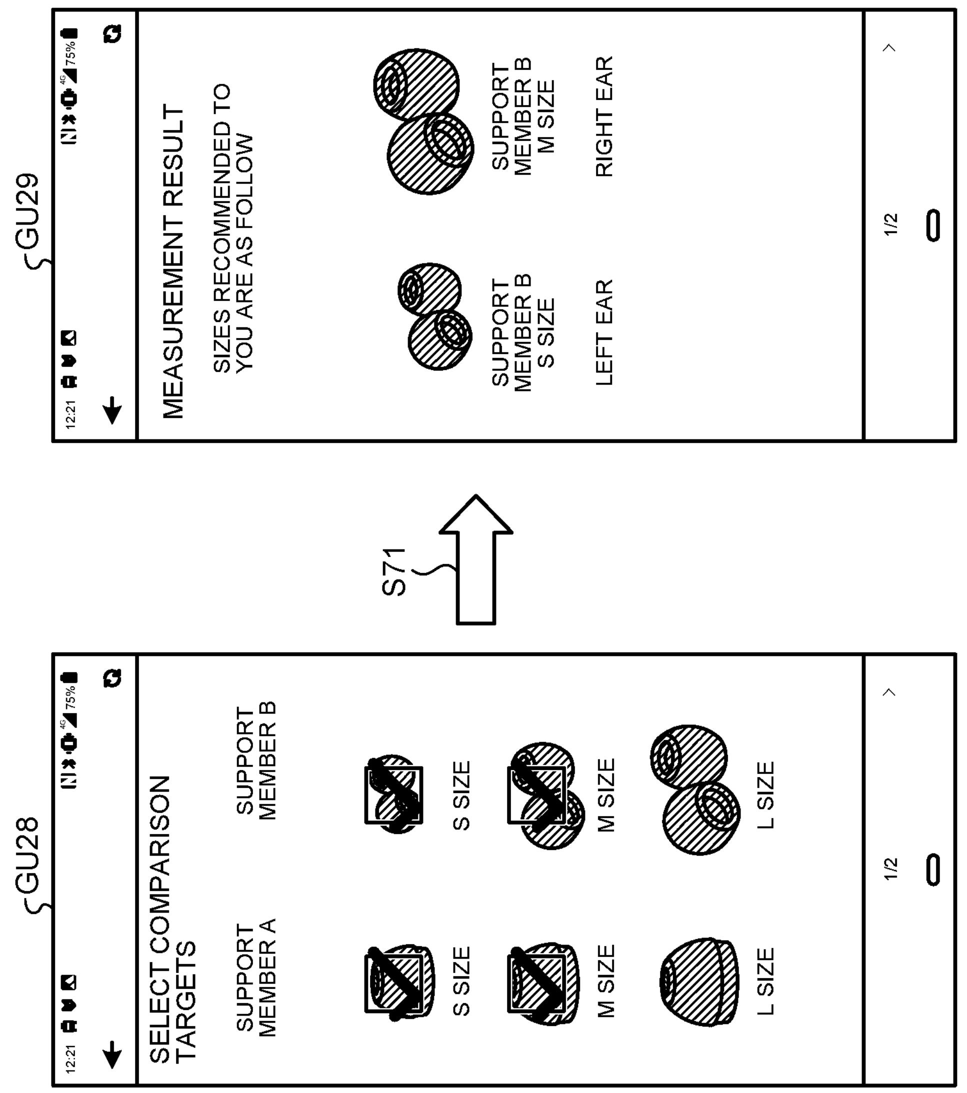
FIGS. 21A and 21B are diagrams illustrating an example of filter switching processing according to the embodiment.

FIGS. 21A and 21B are diagrams for performing processing for adjusting sound quality according to optimum support members determined by the information processing device 10. In FIGS. 21A and 21B, since four types of support members having different materials and sizes determined as the optimum support members are selected as comparison targets, comparison of sealing degrees among the materials of the support members is performed. The information processing system 1 displays screen information indicating optimum support members determined by the information processing device 10. Note that, in FIGS. 21A and 21B, check marks are shown on the optimum support members determined by the information processing device 10. However, anything may be used if the determination by the information processing device 10 is clearly indicated. FIG. 21A illustrates a case in which a screen GU28 showing four types of support members having different materials and sizes is displayed on the GUI and the support members A and the support members B of the S size and the M size are determined as optimum support members. In this case, check marks are added to the determined support members. The support members added with the check marks are selected as comparison targets. The information processing system 1 measures sealing degrees of the support members A and the support members B of the S size and the M size selected as the comparison targets in both the ears of the user and displays a screen GU29 (S71). FIG. 21B illustrates a case where the screen GU29 showing a measurement result of sealing degrees is displayed. The information processing system 1 determines, based on the measurement result, the support members B of the S size and the M size as support members respectively corresponding to the ears of the user. Note that, for example, the information processing system 1 may change the noise cancelling filter to a filter of the material of the selected support members B. At this time, the information processing system 1 may not display, on the GUI, to the effect that the filter is changed to the filter of the material of the support member B.

Figure 22:
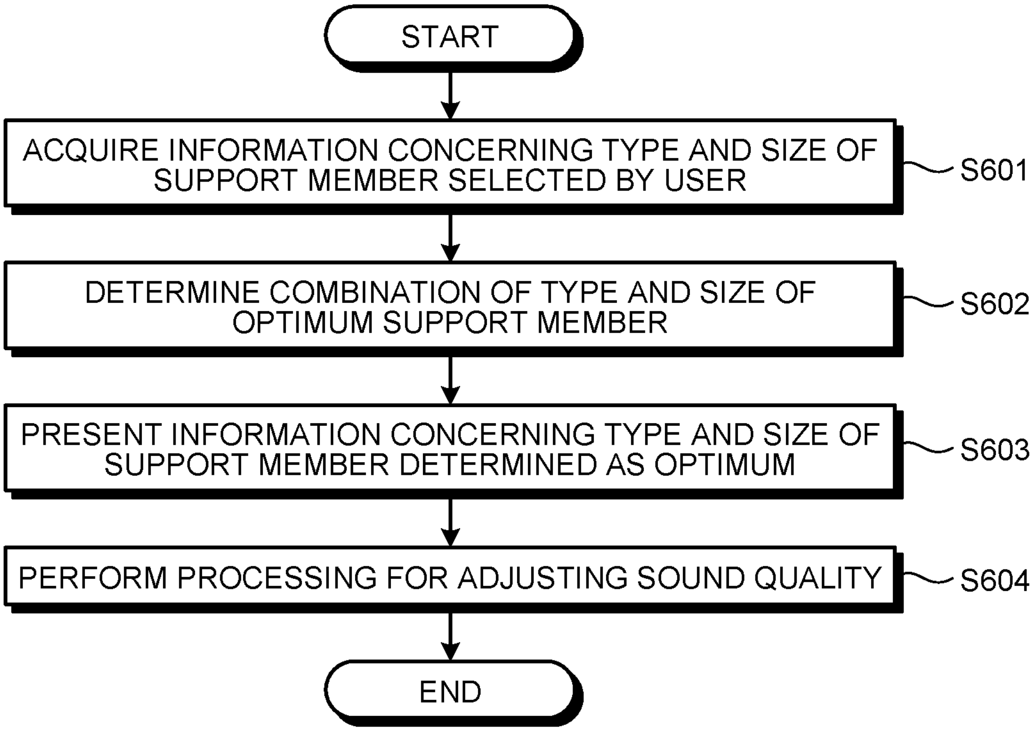
FIG. 22 is a flowchart illustrating a flow of sound quality adjustment processing in the information processing device according to the embodiment.

FIG. 22 is a flowchart illustrating a flow of the sound quality adjustment processing in the information processing device 10 illustrated in FIGS. 21A and 21B. The information processing device 10 acquires information concerning a combination of a type and a size of a support member at as a measurement target selected by the user (S601). Then, the information processing device 10 determines a combination of a type and a size of the optimum support member based on comparison of sealing degrees in the combination of the type and the size of the selected support member (S602). For example, the information processing device 10 determines a combination of the type and size of the optimum support member based on the processing illustrated in FIG. 16. The information processing device 10 performs processing for presenting information concerning the combination of the type and size of the support member determined as optimum (S603). For example, the information processing device 10 performs processing for presenting display such as "A support member of ×× type and ○○ size is optimum for you" or presenting the display to the user by voice. The information processing device 10 performs processing for adjusting sound quality based on the combination of the type and the size of the support member determined as optimum (S604). For example, the information processing device 10 adjusts the sound quality adjustment filter and the noise cancelling filter.

3. HARDWARE CONFIGURATION EXAMPLE

Figure 23:
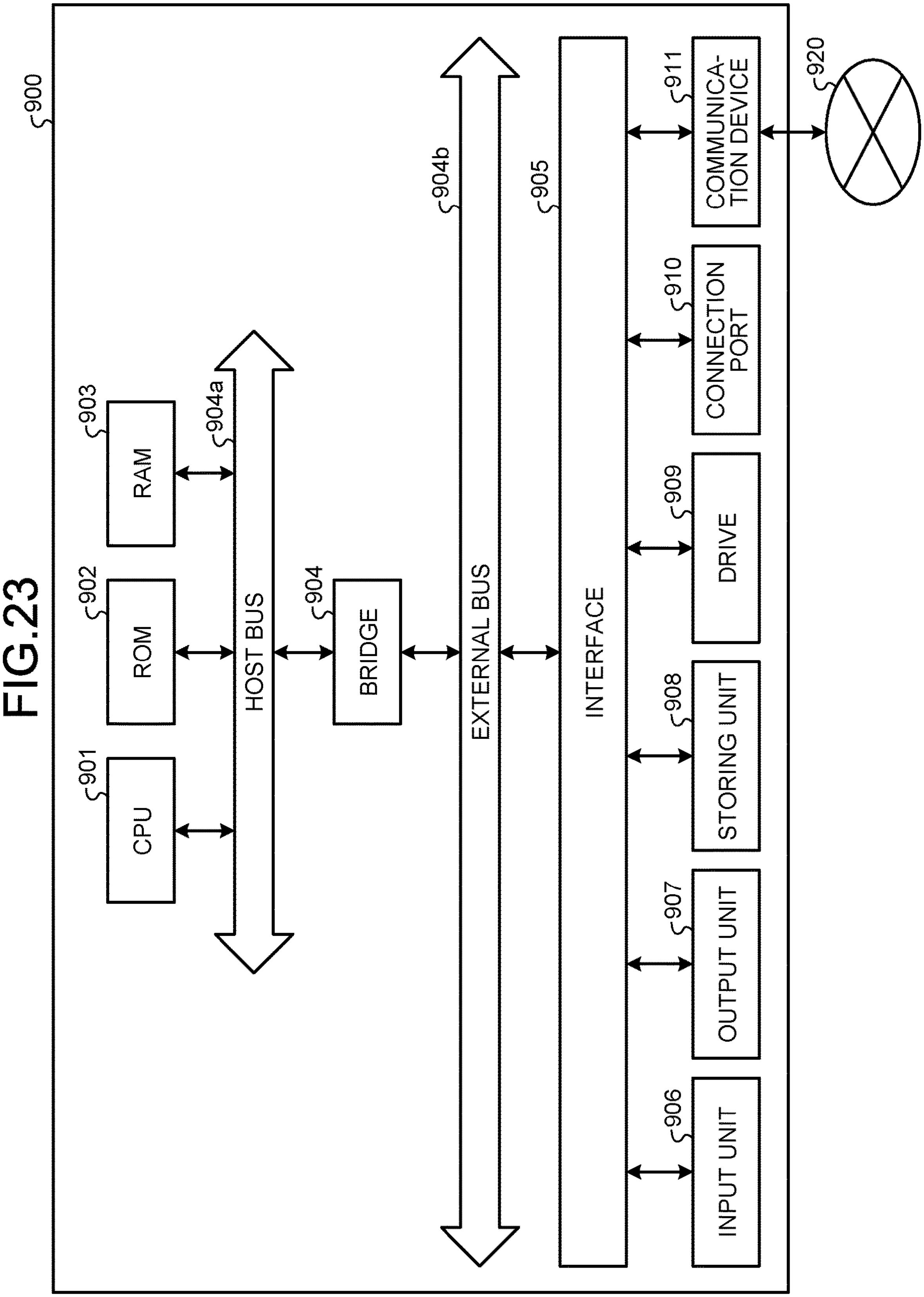
FIG. 23 is a hardware configuration diagram illustrating an example of a computer that realizes functions of an information processing device.

Finally, a hardware configuration example of the information processing device according to the embodiment is explained with reference to FIG. 23. FIG. 23 is a block diagram illustrating a hardware configuration example of the information processing device according to the embodiment. Note that an information processing device 900 illustrated in FIG. 23 can realize, for example, the information processing device 10, the earphone 20, and the terminal device 30 illustrated in FIG. 3. Information processing by the information processing device 10, the earphone 20, and the terminal device 30 according to the embodiment is realized by cooperation of software (configured by a computer program) and hardware explained below.

As illustrated in FIG. 23, the information processing device 900 includes a central processing unit (CPU) 901, a read only memory (ROM) 902, and a random access memory (RAM) 903. The information processing device 900 includes a host bus 904*a*, a bridge 904, an external bus 904*b*, an interface 905, an input device 906, an output device 907, a storage device 908, a drive 909, a connection port 910, and a communication device 911. Note that a hardware configuration illustrated here is an example and a part of the components may be omitted. The hardware configuration may further include components other than the components illustrated here.

The CPU 901 functions as, for example, an arithmetic processing device or a control device and controls the overall operation of the components or a part thereof based on various computer programs recorded in the ROM 902, the RAM 903, or the storage device 908. The ROM 902 is means for storing a program to be read by the CPU 901, data used for an arithmetic operation, and the like. In the RAM 903, for example, a program to be read by the CPU 901 and data (part of the program) such as various parameters that change as appropriate when the program is executed are temporarily or permanently stored. These are mutually connected by the host bus 904*a* configured by a CPU bus or the like. The CPU 901, the ROM 902, and the RAM 903 can realize the functions of the control unit 110, the control unit 210, and the control unit 310 explained with reference to FIG. 3, for example, in cooperation with software.

The CPU 901, the ROM 902, and the RAM 903 are mutually connected via, for example, the host bus 904*a* capable of performing high-speed data transmission. On the other hand, the host bus 904*a* is connected to the external bus 904*b* having a relatively low data transmission speed via, for example, the bridge 904. The external bus 904*b* is connected to various components via the interface 905.

The input device 906 is realized by a device to which information is input by the listener such as a mouse, a keyboard, a touch panel, a button, a microphone, a switch, or a lever. The input device 906 may be, for example, a remote control device using infrared rays or other radio waves or may be an external connection device such as a cellular phone or a PDA corresponding to operation of the information processing device 900. Further, the input device 906 may include, for example, an input control circuit that generates an input signal based on information input using the input means described above and outputs the input signal to the CPU 901. By operating the input device 906, an administrator of the information processing device 900 can input various data to the information processing device 900 and instruct the information processing device 900 to perform a processing operation.

Besides, the input device 906 can be formed by a device that detects the position of the user. For example, the input device 906 can include various sensors such as an image sensor (for example, a camera), a depth sensor (for example, a stereo camera), an acceleration sensor, a gyro sensor, a geomagnetic sensor, an optical sensor, a sound sensor, a distance measurement sensor (for example, a Time of Flight (ToF) sensor), and a force sensor. The input device 906 may acquire information concerning a state of the information processing device 900 itself such as a posture and moving speed of the information processing device 900 and information concerning a peripheral space of the information processing device 900 such as brightness and noise around the information processing device 900. The input device 906 may include a global navigation satellite system (GNSS) module that receives a GNSS signal (for example, a global positioning system (GPS) signal from a GPS satellite) from a GNSS satellite and measures position information including the latitude, the longitude, and the altitude of the device. Concerning the position information, the input device 906 may detect a position by transmission and reception with Wi-Fi (registered trademark), a mobile phone, a PHS, a smartphone, or the like, near field communication, or the like. The input device 906 can realize, for example, the function of the acquiring unit 111 explained with reference to FIG. 3.

The output device 907 is formed of a device capable of visually or auditorily notifying acquired information to the user. As such a device, there are a display device such as a CRT display device, a liquid crystal display device, a plasma display device, an EL display device, a laser projector, an LED projector, and a lamp, a sound output device such as a speaker and a headphone, and a printer device. The output device 907 outputs, for example, results obtained by various kinds of processing performed by the information processing device 900. Specifically, the display device visually displays results obtained by various kinds of processing performed by the information processing device 900 in various formats such as text, images, tables, and graphs. On the other hand, the audio output device converts an audio signal formed by reproduced audio data, acoustic data, or the like into an analog signal and auditorily outputs the analog signal. The output device 907 can realize, for example, the functions of the output unit 113, the output unit 220, and the output unit 320 explained with reference to FIG. 3.

The storage device 908 is a device for data storage formed as an example of a storing unit of the information processing device 900. The storage device 908 is realized by, for example, a magnetic storage device such as an HDD, a semiconductor storage device, an optical storage device, or a magneto-optical storage device. The storage device 908 may include a storage medium, a recording device that records data in the storage medium, a reading device that reads data from the storage medium, and a deletion device that deletes data recorded in the storage medium. The storage device 908 stores computer programs to be executed by the CPU 901, various data, various data acquired from the outside, and the like. The storage device 908 can realize, for example, the function of the storing unit 120 explained with reference to FIG. 3.

The drive 909 is a reader/writer for a storage medium and is incorporated in or externally attached to the information processing device 900. The drive 909 reads information recorded in a removable storage medium such as a magnetic disk, an optical disk, a magneto-optical disk, or a semiconductor memory inserted in the drive 909 and outputs the information to the RAM 903. The drive 909 can also write information in the removable storage medium.

The connection port 910 is, for example, a port for connecting an external connection device such as a universal serial bus (USB) port, an IEEE 1394 port, an small computer system interface (SCSI), an RS-232C port, or an optical audio terminal.

The communication device 911 is, for example, a communication interface formed by a communication device or the like for connection to the network 920. The communication device 911 is, for example, a communication card for a wired or wireless local area network (LAN), a long term evolution (LTE), Bluetooth (registered trademark), or a wireless USB (WUSB). The communication device 911 may be a router for optical communication, a router for Asymmetric Digital Subscriber Line (ADSL), a modem for various kinds of communications, or the like. The communication device 911 can transmit and receive signals and the like, for example, to and from the Internet and other communication devices according to a predetermined protocol such as TCP/IP. The communication device 911 can realize, for example, the functions of the communication unit 100, the communication unit 200, and the communication unit 300 explained with reference to FIG. 3.

Note that the network 920 is a wired or wireless transmission path for information transmitted from a device connected to the network 920. For example, the network 920 may include a public line network such as the Internet, a telephone line network, or a satellite communication network, and various LANs (Local Area Networks) including Ethernet (registered trademark) and wide area networks (WANs). The network 920 may include a dedicated line network such as an Internet protocol-virtual private network (IP-VPN).

An example of the hardware configuration capable of realizing the functions of the information processing device 900 according to the embodiment is explained above. The components explained above may be realized using general-purpose members or may be realized by hardware specialized for the functions of the components. Therefore, it is possible to change a hardware configuration in use as appropriate according to a technical level at the time of carrying out the embodiment.

4. SUMMARY

As explained above, the information processing device 10 according to the embodiment performs the processing for determining the earphone 20 optimum for the user out of the plurality of earphones 20 based on the sealing degrees measured for the respective plurality of earphones 20 having the different sizes. For example, the information processing device 10 measures a sealing degree of the ear canal of the user by the earphone 20 based on an ear canal frequency characteristic measured by collecting a measurement signal output from the speaker of the earphone 20 and returned. Consequently, the information processing device 10 can appropriately determine the optimum earphone 20. Consequently, the information processing device 10 can promote further improvement in usability.

The information processing device 10 determines, as an optimum wearing state, when a wearing state is changed using a sealing degree of the optimum earphone 20 as a reference value, a wearing state in which a sealing degree is the largest among wearing states corresponding to sealing degrees exceeding the reference value. As explained above, the information processing device 10 determines an optimum wearing state for each user. Specifically, the information processing device 10 determines a reference value for each user without setting the reference value as an absolute value and determines the optimum wearing state. Consequently, the information processing device 10 can reduce the possibility of causing discomfort to the user. Although a shape and characteristics of an ear are different for each individual user, in the present embodiment, it is possible to determine the optimum earphone 20 having the largest sealing degree with respect to the shape of the ear of each individual user.

Accordingly, it is possible to provide an information processing device, ab information processing method, and an information processing program, which are new and improved, capable of promoting further improvement in usability.

The preferred embodiment of the present disclosure is explained in detail above with reference to the accompanying drawings. However, the technical scope of the present disclosure is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure.

For example, the devices explained in the present specification may be realized as independent devices or a part or all of the devices may be realized as separate devices. For example, the information processing device 10, the earphone 20, and the terminal device 30 illustrated in FIG. 9 may be realized as independent devices. Furthermore, for example, the devices may be realized as server devices connected to the information processing device 10, the earphone 20, and the terminal device 30 via a network or the like. The function of the control unit 110 included in the information processing device 10 may be included in a server device connected via a network or the like.

A series of processing by the devices explained in the present specification may be realized using any of software, hardware, and a combination of the software and the hardware. Computer programs configuring the software are stored in advance in, for example, a recording medium (a non-transitory medium) provided inside or outside of the devices. For example, the programs are read into a RAM at the time of execution by a computer and executed by a processor such as a CPU.

The processing explained using the flowcharts in the present specification may not necessarily be executed in the illustrated order. Several processing steps may be executed in parallel. Additional processing steps may be adopted or a part of the processing steps may be omitted.

The effects described in the present specification are only explanatory or illustrative and are not limiting. That is, the technique according to the present disclosure can achieve other effects obvious for those skilled in the art from the description of the present specification together with or instead of the effects described above.

Note that the following configurations also belong to the technical scope of the present disclosure.

(1)

An information processing device including:

an acquiring unit that acquires information concerning a sound propagating in a space separated from an outside world by a support member that separates the space including an eardrum of a user and the outside world; and a measuring unit that measures a sealing degree of the space by the support member based on the information concerning the sound acquired by the acquiring unit; and a determining unit that determines, based on sealing degrees measured by the measuring unit for a respective plurality of different support members, an optimum support member for the user out of the plurality of support members.

(2)

The information processing device according to (1), wherein the determining unit determines a support member, the sealing degree of which measured by the measuring unit is highest, as the optimum support member.

(3)

The information processing device according to (1) or (2), wherein the acquiring unit acquires information concerning the sound emitted from the support member and measured through an ear canal of the user.

(4)

The information processing device according to any one of (1) to (3), wherein the acquiring unit acquires information concerning the sound emitted from a first member to which the support member is attached and collected by a second member different from the first member to which the support member is attached. (5)

The information processing device according to any one of (1) to (4), wherein the determining unit determines the optimum support member out of the plurality of support members selected in advance by the user.

(6)

The information processing device according to any one of (1) to (5), wherein the determining unit determines the optimum support member out of the plurality of support members having different sizes. (7)

The information processing device according to any one of (1) to (6), wherein the determining unit determines the optimum support member out of the plurality of support members having different predetermined materials.

(8)

The information processing device according to any one of (1) to (7), wherein the determining unit determines, using a sealing degree of the optimum support member as a reference value, as an optimum wearing state, a wearing state in which a sealing degree is largest among wearing states corresponding to sealing degrees exceeding the reference value at a time when a wearing state of the optimum support member is changed.

(9)

The information processing device according to (8), wherein the determining unit determines a wearing angle at which a sealing degree is largest as an optimum wearing angle based on a wearing angle of the optimum support member.

(10)

The information processing device according to (8) or (9), wherein the determining unit determines a wearing depth at which a sealing degree is largest as an optimum wearing depth based on a wearing depth of the optimum support member.

(11)

The information processing device according to any one of (1) to (10), wherein the measuring unit measures the sealing degree based on a relation between a frequency of a measurement signal, which is a sum signal of a different plurality of frequencies, and an acoustic characteristic of the user.

(12)

The information processing device according to (11), wherein the measuring unit measures the sealing degree based on the measurement signal including a first frequency included in a frequency band of an audible range and a second frequency having a frequency different from the first frequency.

(13)

The information processing device according to (12), wherein the audible range is 5 Hz to 20, 000 Hz.

(14)

The information processing device according to any one of (1) to (13), wherein the acquiring unit acquires sound information concerning sound around the user, and the measuring unit measures the sealing degree based on information concerning the sound for which noise cancelling processing is executed based on the peripheral sound information acquired by the acquiring unit.

(15)

The information processing device according to (14), wherein the measuring unit executes, based on the peripheral sound information collected by the second member to which the support member is attached, the noise cancelling processing on the sound output from the first member included in the support member.

(16)

The information processing device according to any one of (1) to (15), further including an output unit that displays information concerning the optimum support member and outputs output information for displaying information concerning the support member determined as optimum by the determining unit in past.

(17)

The information processing device according to (16), wherein the output unit outputs, using a sealing degree of the optimum support member as a reference value, output information for displaying, in a predetermined form, a sealing degree with respect to the reference value at a time when a wearing state of the optimum support member is changed.

(18)

The information processing device according to (17), wherein the output unit outputs warning display or warning sound when a sealing degree at a time when a wearing state of the optimum support member is changed does not exceed the reference value.

(19)

The information processing device according to any one of (1) to (18), further including an adjusting unit that performs processing for adjusting sound quality according to a material of the support member selected by the user or the optimum support member determined by the determining unit.

(20)

The information processing device according to (19), wherein, as the processing, the adjusting unit adjusts a sound quality adjustment filter.

(21)

The information processing device according to (19) or (20), wherein the adjusting unit performs the adjustment of the sound quality with noise cancelling.

(22)

An information processing method executed by a computer, the information processing method including:

an acquiring step of acquiring information concerning sound propagating in a space separated from an outside world by a support member that separates the space including an eardrum of a user and the outside world;

a measuring step of measuring a sealing degree of the space by the support member based on the information concerning the sound acquired in the acquiring step; and a determining step of determining, based on sealing degrees measured in the measuring step for a respective different plurality of support members, an optimum support member for the user out of the plurality of support members.

(23)

An information processing program for causing a computer to execute:

an acquiring procedure for acquiring information concerning sound propagating in a space separated from an outside world by a support member that separates the space including an eardrum of a user and the outside world;

a measuring procedure for measuring a sealing degree of the space by the support member based on the information concerning the sound acquired in the acquiring procedure; and a determining procedure for determining, based on sealing degrees measured in the measuring procedure for a respective different plurality of support members, an optimum support member for the user out of the plurality of support members.

(24)

An information processing system including:

a support member that separates a space including an eardrum of a user and an outside world;

an information processing device that measures, based on information concerning sound propagating in the space separated from the outside world by the support member, a sealing degree of the space by the support member and determines, based on sealing degrees of the space measured for a respective different plurality of support members, an optimum support member for the user out of the plurality of the support members; and a terminal device that outputs information concerning the optimum support member.

REFERENCE SIGNS LIST

1 INFORMATION PROCESSING SYSTEM
10 INFORMATION PROCESSING DEVICE
20 EARPHONE
30 TERMINAL DEVICE
100 COMMUNICATION UNIT
110 CONTROL UNIT
111 ACQUIRING UNIT
112 PROCESSING UNIT
1121 MEASURING UNIT
1122 DETERMINING UNIT
1123 ADJUSTING UNIT
113 OUTPUT UNIT
200 COMMUNICATION UNIT
210 CONTROL UNIT
220 OUTPUT UNIT
230 INPUT UNIT
300 COMMUNICATION UNIT
310 CONTROL UNIT
320 OUTPUT UNIT

The invention claimed is:

1. An information processing device, including:

an acquiring unit configured to acquire information concerning sound that propagates in a space separated, from an outside world, by a support member of a plurality of different support members, wherein the support member separates the space including an eardrum of a user and the outside world;

a measuring unit configured to measure a sealing degree of the space separated by the support member based on the information concerning the sound acquired by the acquiring unit, and a relation between a frequency of a measurement signal, which is a sum signal of a different plurality of frequencies, and an acoustic characteristic of the user; and a determining unit configured to determine, based on sealing degrees measured by the measuring unit for the plurality of different support members, an optimum support member for the user out of the plurality of different support members.

2. The information processing device according to claim 1, wherein the determining unit is further configured to determine the support member as the optimum support member, based on the sealing degree of the support member is highest among the sealing degrees.

3. The information processing device according to claim 1, wherein the sound is emitted from the support member.

4. The information processing device according to claim 1, wherein the support member is attached to a first member and a second member, and the sound is emitted from the first member and is collected by the second member.

5. The information processing device according to claim 1, wherein the determining unit is further configured to determine the optimum support member out of the plurality of different support members selected in advance by the user.

6. The information processing device according to claim 1, wherein the determining unit is further configured to determine the optimum support member out of the plurality of different support members having different sizes.

7. The information processing device according to claim 1, wherein the determining unit is further configured to determine the optimum support member out of the plurality of different support members having different materials.

8. The information processing device according to claim 1, wherein the determining unit is further configured to determine a wearing state as an optimum wearing state, the wearing state is determined as the optimum wearing state based on a sealing degree of the optimum support member as a reference value, and a sealing degree for the wearing state is largest among wearing states corresponding to sealing degrees exceeding the reference value at a time in which the wearing state of the optimum support member is changed.

9. The information processing device according to claim 8, wherein the determining unit is further configured to determine a wearing angle at which a sealing degree is largest as an optimum wearing angle, based on a wearing angle of the optimum support member.

10. The information processing device according to claim 8, wherein the determining unit is further configured to determine a wearing depth at which a sealing degree is largest as an optimum wearing depth, based on a wearing depth of the optimum support member.

11. The information processing device according to claim 1, wherein the measuring unit is further configured to measure the sealing degree based on the measurement signal including a first frequency included in a frequency band of an audible range, and a second frequency having a frequency different from the first frequency.

12. The information processing device according to claim 11, wherein the audible range is 5 Hz to 20,000 Hz.

13. The information processing device according to claim 1, wherein the acquiring unit is further configured to acquire peripheral sound information concerning peripheral sound around the user, and the measuring unit is further configured to:

execute a noise cancelling processing operation on the sound, based on the peripheral sound information; and measure the sealing degree based on information concerning the sound for which the noise cancelling processing operation is executed.

14. The information processing device according to claim 13, wherein the support member is attached to a first member and a second member, and the measuring unit is further configured to execute, based on the peripheral sound collected by the second member, the noise cancelling processing operation on the sound output from the first member.

15. The information processing device according to claim 1, further including an output unit configured to:

output information concerning the optimum support member; and output output information to display information concerning the support member determined as optimum by the determining unit in the past.

16. The information processing device according to claim 15, wherein the output unit is configured to output, based on a sealing degree of the optimum support member as a reference value, output information to display, in a specific form, a sealing degree with respect to the reference value at a time in which a wearing state of the optimum support member is changed.

17. The information processing device according to claim 16, wherein the output unit is configured to output warning display or warning sound when the sealing degree, at the time in which the wearing state of the optimum support member is changed, does not exceed the reference value.

18. The information processing device according to claim 1, further including an adjusting unit configured to adjust a sound quality based on at least a material of the support member selected by the user or the optimum support member determined by the determining unit.

19. The information processing device according to claim 18, wherein, the adjusting unit is further configured to adjust the sound quality by an adjustment filter.

20. The information processing device according to claim 18, wherein the adjusting unit is further configured to adjust the sound quality with noise cancelling.

21. An information processing method executed by a computer, the information processing method including:

acquiring information concerning sound propagating in a space separated, from an outside world, by a support member of a plurality of different support members, wherein the support member separates the space including an eardrum of a user and the outside world;

measuring a sealing degree of the space separated by the support member based on the acquired information concerning the sound, and a relation between a frequency of a measurement signal, which is a sum signal of a different plurality of frequencies, and an acoustic characteristic of the user; and determining, based on sealing degrees for the plurality of different support members, an optimum support member for the user out of the plurality of different support members.

22. A non-transitory computer readable storage medium having stored thereon, computer-executable instructions which, when executed by a computer, cause the computer to execute operations, the operations comprising:

acquiring information concerning sound propagating in a space separated, from an outside world, by a support member of a plurality of different support members, wherein the support member separates the space including an eardrum of a user and the outside world;

measuring a sealing degree of the space separated by the support member based on the acquired information concerning the sound, and a relation between a frequency of a measurement signal, which is a sum signal of a different plurality of frequencies, and an acoustic characteristic of the user; and determining, based on sealing degrees for the plurality of different support members, an optimum support member for the user out of the plurality of different support members.

* * * * *